United States Patent
Wang et al.

(10) Patent No.: US 11,728,946 B2
(45) Date of Patent: Aug. 15, 2023

(54) TECHNIQUES TO FACILITATE PHASE CONTINUITY OF SIDELINK DMRS BUNDLING

(71) Applicant: QUALCOMM Incorporated, San Diego, CA (US)

(72) Inventors: Xiaojie Wang, Hillsborough, NJ (US); Xiaoxia Zhang, San Diego, CA (US); Jing Sun, San Diego, CA (US); Junyi Li, Fairless Hills, PA (US); Piyush Gupta, Bridgewater, NJ (US); Peter Gaal, San Diego, CA (US); Sony Akkarakaran, Poway, CA (US); Jung Ho Ryu, Fort Lee, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/390,846

(22) Filed: Jul. 30, 2021

(65) Prior Publication Data
US 2023/0044215 A1    Feb. 9, 2023

(51) Int. Cl.
*H04L 5/00* (2006.01)
*H04W 72/0446* (2023.01)
*H04W 72/0453* (2023.01)
*H04W 72/20* (2023.01)
*H04W 92/18* (2009.01)

(52) U.S. Cl.
CPC ....... *H04L 5/0051* (2013.01); *H04W 72/0446* (2013.01); *H04W 72/0453* (2013.01); *H04W 72/20* (2023.01); *H04W 92/18* (2013.01)

(58) Field of Classification Search
CPC ............... H04L 5/0051; H04L 5/0048; H04W 72/0446; H04W 72/0453; H04W 72/20; H04W 92/18; H04W 72/048; H04W 76/14
See application file for complete search history.

(56) References Cited

U.S. PATENT DOCUMENTS

2019/0222380 A1* 7/2019 Manolakos ......... H04L 25/0224

FOREIGN PATENT DOCUMENTS

| EP | 3952421 A1 * | 2/2022 | ........... H04L 5/0057 |
| WO | WO-2022212234 A1 * | 10/2022 | |

* cited by examiner

*Primary Examiner* — Thai Nguyen
(74) *Attorney, Agent, or Firm* — Procopio, Cory, Hargreaves & Savitch LLP

(57) ABSTRACT

Apparatus, methods, and computer-readable media for facilitating techniques for phase continuity of sidelink DMRS bundling are disclosed herein. An example method for wireless communication at a first UE includes receiving a first sidelink transmission including at least a first DMRS. The example method also includes receiving a second sidelink transmission, the first sidelink transmission and the second sidelink transmission together including at least the first DMRS and a second DMRS. The example method also includes receiving, from a second UE, an indication of a bundling relationship between the first sidelink transmission and the second sidelink transmission, the bundling relationship including at least one of strong bundling, weak bundling, or no bundling. The example method also includes performing channel estimation for a channel associated with the first sidelink transmission and the second sidelink transmission based at least in part on the bundling relationship.

30 Claims, 16 Drawing Sheets

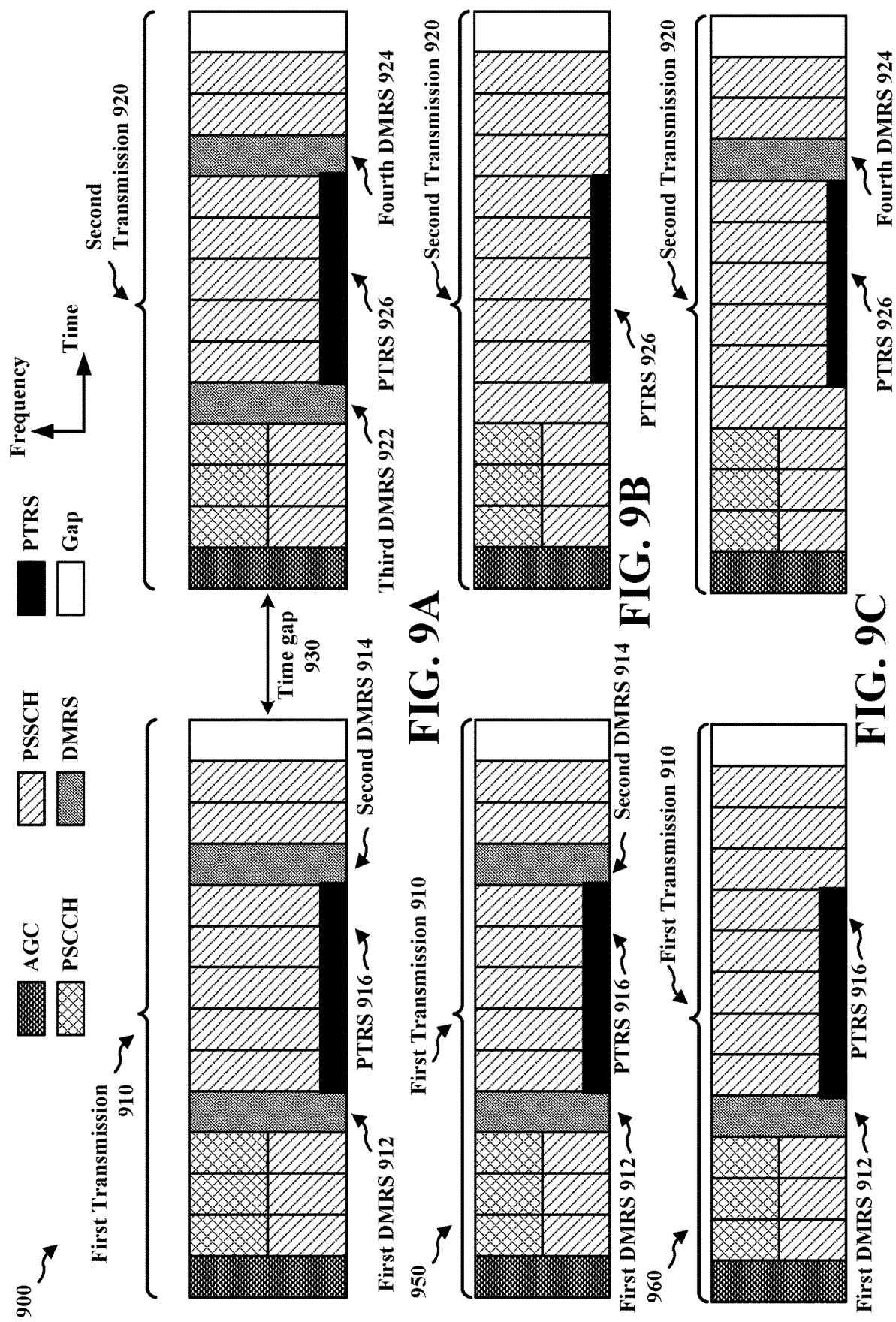

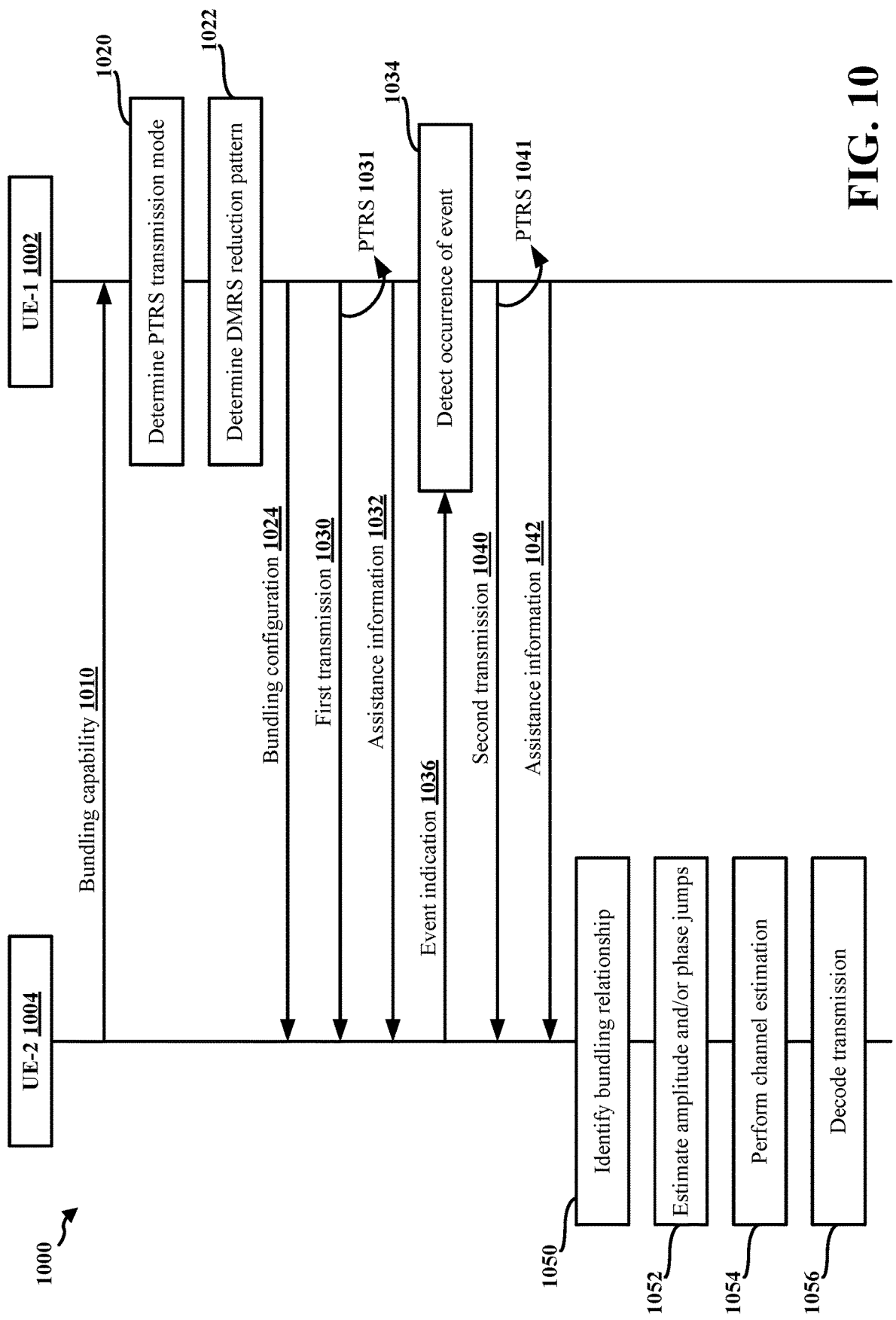

TECHNIQUES TO FACILITATE PHASE CONTINUITY OF SIDELINK DMRS BUNDLING

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). An example apparatus receives a first sidelink transmission including at least a first DMRS and receives a second sidelink transmission, the first sidelink transmission and the second sidelink transmission together including at least the first DMRS and a second DMRS. The apparatus receives, from a second UE, an indication of a bundling relationship between the first sidelink transmission and the second sidelink transmission, the bundling relationship including at least one of strong bundling, weak bundling, or no bundling. The apparatus performs channel estimation for a channel associated with the first sidelink transmission and the second sidelink transmission based at least in part on the bundling relationship.

In another aspect of the disclosure, a method, a computer-readable medium, and an apparatus are provided for wireless communication at a user equipment (UE). An example apparatus transmits a first sidelink transmission including at least a first DMRS and transmits a second sidelink transmission, the first sidelink transmission and the second sidelink transmission together including at least the first DMRS and a second DMRS. The apparatus transmits, to a second UE, an indication of a bundling relationship between the first sidelink transmission and the second sidelink transmission, the bundling relationship including at least one of strong bundling, weak bundling, or no bundling.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9A illustrates an example including a first transmission and a second transmission each including an additional reference signal to facilitate sidelink DMRS bundling, in accordance with the teachings disclosed herein.

FIG. 9B illustrates an example including a first DMRS reduction pattern associated with a first transmission and a second transmission, in accordance with the teachings disclosed herein.

FIG. 9C illustrates an example including a second DMRS reduction pattern associated with a first transmission and a second transmission, in accordance with the teachings disclosed herein.

FIG. 10 is an example communication flow between a first UE and a second UE, in accordance with the teachings disclosed herein.

DETAILED DESCRIPTION

Figure 1:
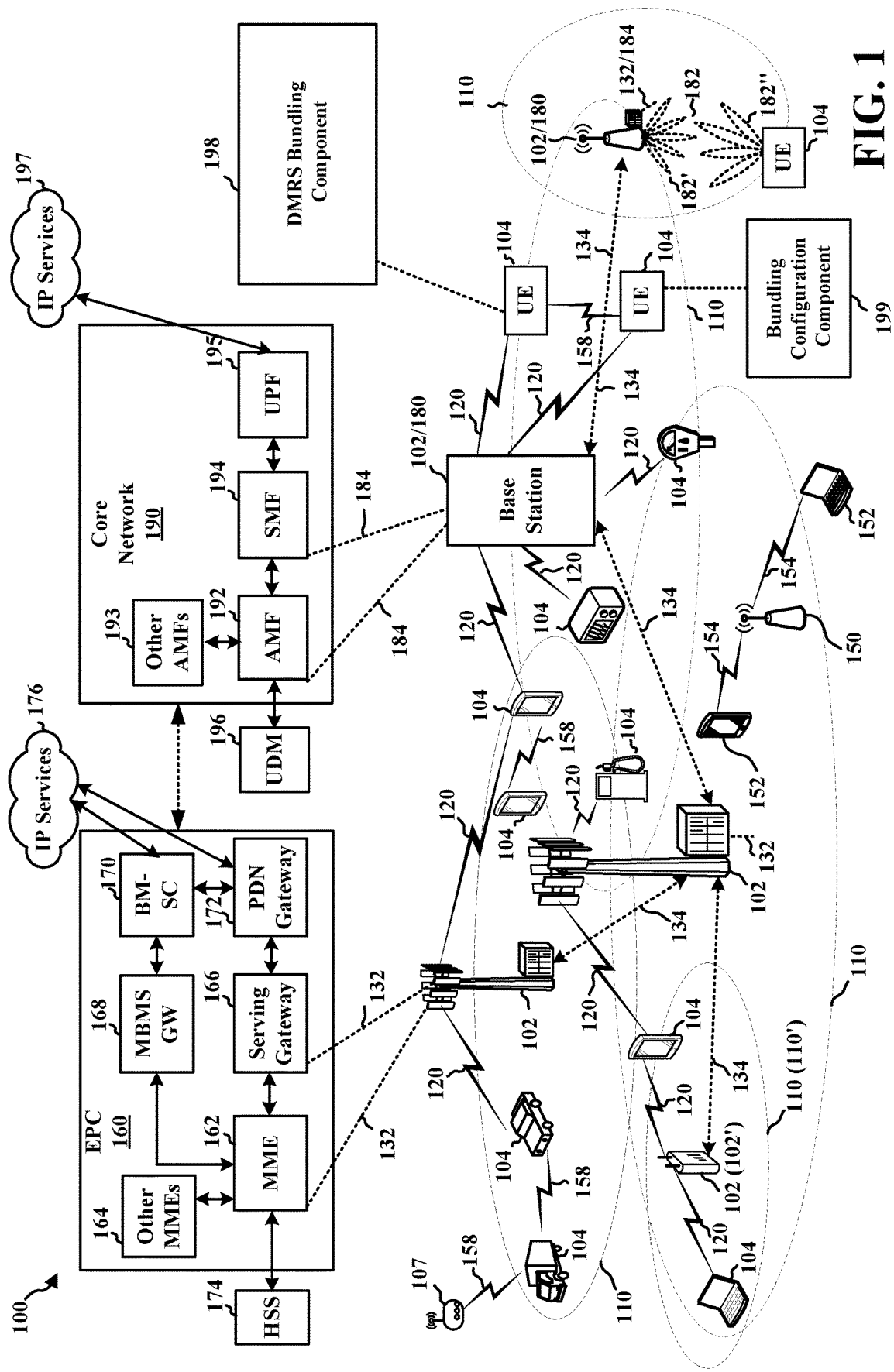
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

In some wireless communications systems, data transmissions by a transmitting device may be accompanied by demodulation reference signals, which may be used by a receiving device to support demodulating or otherwise decoding the data transmissions. The transmitting device and the receiving device may each use a precoding configuration, which may be negotiated or otherwise communicated between the transmitting device and the receiving device.

Aspects of the precoding configuration may support encoding the data transmission by the transmitting device and decoding the encoded data transmission by the receiving device. In some cases, techniques for bundling of demodulation reference signals may be supported, and the receiving device may be configured to operate as if the same precoder is used by a transmitting device across the data channels of different scheduling units. For example, when demodulation reference signals are coherently transmitted over different time intervals or different antenna ports, demodulation reference signals over different time instants or antenna ports can be coherently filtered or otherwise processed by a receiving device to enhance the accuracy or efficiency of channel estimation for physical channel transmissions.

Demodulation reference signals may be transmitted in combination with physical control channel transmissions and physical data channel transmissions. For example, in sidelink communications, demodulation reference signals may be transmitted with PSCCH transmissions and/or PSSCH transmissions.

An antenna port may be defined by a transmitted reference signal (e.g. a demodulation reference signal for sidelink communication). The receiving device can use a reference signal (e.g., the demodulation reference signal) transmitted on an antenna port to estimate the channel for this antenna port. The channel estimate can subsequently be used for decoding data transmitted on the same antenna port. For example, the demodulation reference signal may be used for channel estimation to decode data transmitted on the same antenna port.

In some examples, techniques for bundling of demodulation reference signals may be supported. When demodulation reference signals are coherently transmitted over different slots, the demodulation reference signals may be coherently filtered by the receiving device to increase the accuracy of the channel estimation for physical channel transmissions (e.g., sidelink transmissions). Improving the accuracy of the channel estimation may result in improving the decoding rate of data at the receiving device.

Sidelink DMRS bundling may be used in scenarios to improve coverage extension. For example, a transmitting device may transmit repetitions of a signal that may be received by a receiving device. The receiving device may combine the repetitions to increase the gain of the signal, which may increase the decoding rate of the signal. Sidelink DMRS bundling may also be used to improve the accuracy of the channel estimation.

However, the ability of a sidelink UE to perform sidelink DMRS bundling may be based on an ability of the sidelink UE to maintain phase continuity across transmissions. In some examples, the ability of the sidelink UE to maintain phase continuity may depend on whether the transmissions are contiguous (e.g., back-to-back) or within a threshold duration (e.g., a quantity of symbols, a quantity of slots, or a quantity of frames). In some examples, the ability of the sidelink UE to maintain phase continuity may depend on if the transmitting UE switched to a receiving mode between the transmissions, or switched to transmitting a different signal between the transmissions. Radio frequency (RF) changes at the transmitting UE may be characterized via a transmitting UE matrix $D_t$ and RF changes at the receiving UE may be characterized via a receiving UE matrix $D_r$.

As described above, sidelink DMRS bundling may facilitate performing channel estimation across transmissions. Thus, it may be appreciated that the channel conditions across the transmissions may be the same. That is, when performing sidelink DMRS bundling, the receiving UE may be configured to operate as if the channel conditions at a first transmission and a second transmission are the same. Otherwise, combining the DMRS from the first transmission and the second transmission would not result in an accurate estimate of channel conditions.

Aspects disclosed herein enable the transmitting UE to transmit assistance information that the receiving UE may use to determine how to perform sidelink DMRS bundling. In some examples, the assistance information may indicate that the transmitting UE has the capability to maintain phase continuity across transmissions. The assistance information may additionally or alternatively indicate one or more aspects associated with the transmissions, such as transmission power, a frequency domain resource allocation, DMRS antenna ports, a codebook, transmit spatial parameters, and/or a timing advance.

In some examples, the assistance information may indicate a bundling relationship and/or a structure of the transmitting UE matrix $D_t$ for the transmission. For example, the assistance information may indicate that the bundling relationship between two transmissions is strong, is weak, or that there is no bundling.

In some examples, the assistance information may indicate the structure of the transmitting UE matrix $D_t$. For example, the assistance information may indicate the structure of the transmitting UE matrix $D_t$ is an identity matrix, that the structure of the transmitting UE matrix $D_t$ is a diagonal matrix, that the structure of the transmitting UE matrix $D_t$ is a bi-directional matrix, or that the structure of the transmitting UE matrix $D_t$ is a full matrix.

In some examples, the assistance information may indicate values of the elements of the transmitting UE matrix $D_t$. For example, the assistance information may provide amplitude jumps and/or phase jumps between transmissions. In some examples, the assistance information may indicate ranges of values for the amplitude jumps and/or the phase jumps. For example, the assistance information may indicate that the absolute value of the difference between a first phase and a second phase is less than a delta (e.g., $|\theta_i-\theta_j|<\Delta$).

In some examples, the amplitude jumps and/or the phase jumps may be grouped into different classes. In some such examples, the assistance information may indicate a bundling class and the second UE may determine the amplitude jumps and/or the phase jumps based on the indicated bundling class. For example, a first bundling class may indicate a range of amplitude jumps within 0.1 (e.g., $\alpha\pm0.1$) and a range of phase jumps within 1 degree (e.g., $\theta\pm1°$), a second bundling class may indicate a range of amplitude jumps within 0.5 (e.g., $\alpha\pm0.5$) and a range of phase jumps within 2 degrees (e.g., $\theta\pm2°$), etc.

The receiving UE may use the assistance information to update how to process signals and to determine how to perform the sidelink DMRS bundling.

In some examples, the transmitting UE may have the ability to transmit the structure of the transmitting UE matrix $D_t$, but may not be able to provide values of the elements (e.g., may not be able to provide the amplitude jumps and/or phase jumps). For example, the change in amplitude and/or phase between a first transmission and a second transmission may be random (e.g., within the capabilities of the transmitting UE).

Aspects disclosed herein include techniques for the transmitting UE to insert an additional reference signal with a transmission. The receiving UE may use the additional reference signal to estimate the amplitude jump and/or the phase jump between two transmissions. The receiving UE may use the additional reference signal to estimate the change in amplitude and/or phase between the first transmission and the second transmission.

In some examples, the additional reference signal may include a phase tracking reference signal (PTRS). The PTRS may be used to estimate phase noise, for example, introduced by the transmitting UE and/or the receiving UE. For example, if the receiving UE determines it is able to maintain phase continuity (e.g., the elements of the receiving UE matrix $D_r$ are equal to one), then the receiving UE may use the PTRS to estimate the elements of the transmitting UE matrix $D_t$. In other examples, the receiving UE may be unable to maintain phase continuity while the transmitting UE is able to maintain phase continuity (e.g., the elements of the transmitting UE matrix $D_t$ are equal to one). In such examples, the receiving UE may use the PTRS to estimate the elements of the receiving UE matrix $D_r$.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a receiving UE, such as a UE 104, may be configured to manage one or more aspects of wireless communication by facilitating performing sidelink DMRS bundling. For example, the UE 104 may include a DMRS bundling component 198 configured to receive a first sidelink transmission including at least a first DMRS. The example DMRS bundling component 198 may also be configured to receive a second sidelink transmission, the first sidelink transmission and the second sidelink transmission together including at least the first DMRS and a second DMRS. Additionally, the example DMRS bundling component 198 may be configured to receive, from a second UE, an indication of a bundling relationship between the first sidelink transmission and the second sidelink transmission, the bundling relationship including at least one of strong bundling, weak bundling, or no bundling. The example DMRS bundling component 198 may also be configured to perform channel estimation for a channel associated with the first sidelink transmission and the second sidelink transmission based at least in part on the bundling relationship.

In another configuration, a transmitting UE, such as the UE 104, may be configured to manage or more aspects of wireless communication by facilitating signaling of phase continuity for sidelink DMRS bundling. For example, the UE 104 may include a bundling configuration component 199 configured to transmit a first sidelink transmission including at least a first DMRS. The example bundling configuration component 199 may also be configured to transmit a second sidelink transmission, the first sidelink transmission and the second sidelink transmission together including at least the first DMRS and a second DMRS. Additionally, the example bundling configuration component 199 may be configured to transmit, to a second UE, an indication of a bundling relationship between the first sidelink transmission and the second sidelink transmission, the bundling relationship including at least one of strong bundling, weak bundling, or no bundling.

The aspects presented herein may enable a transmitting UE to indicate phase continuity to a receiving UE for performing sidelink DMRS bundling, which may facilitate improving communication performance, for example, by improving channel estimation and improving decoding rates of sidelink transmissions.

Although the following description provides examples directed to 5G NR (and, in particular, to sidelink transmissions), the concepts described herein may be applicable to other similar areas, such as LTE, LTE-A, CDMA, GSM, and/or other wireless technologies, in which UEs may have the ability to perform sidelink DMRS bundling.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
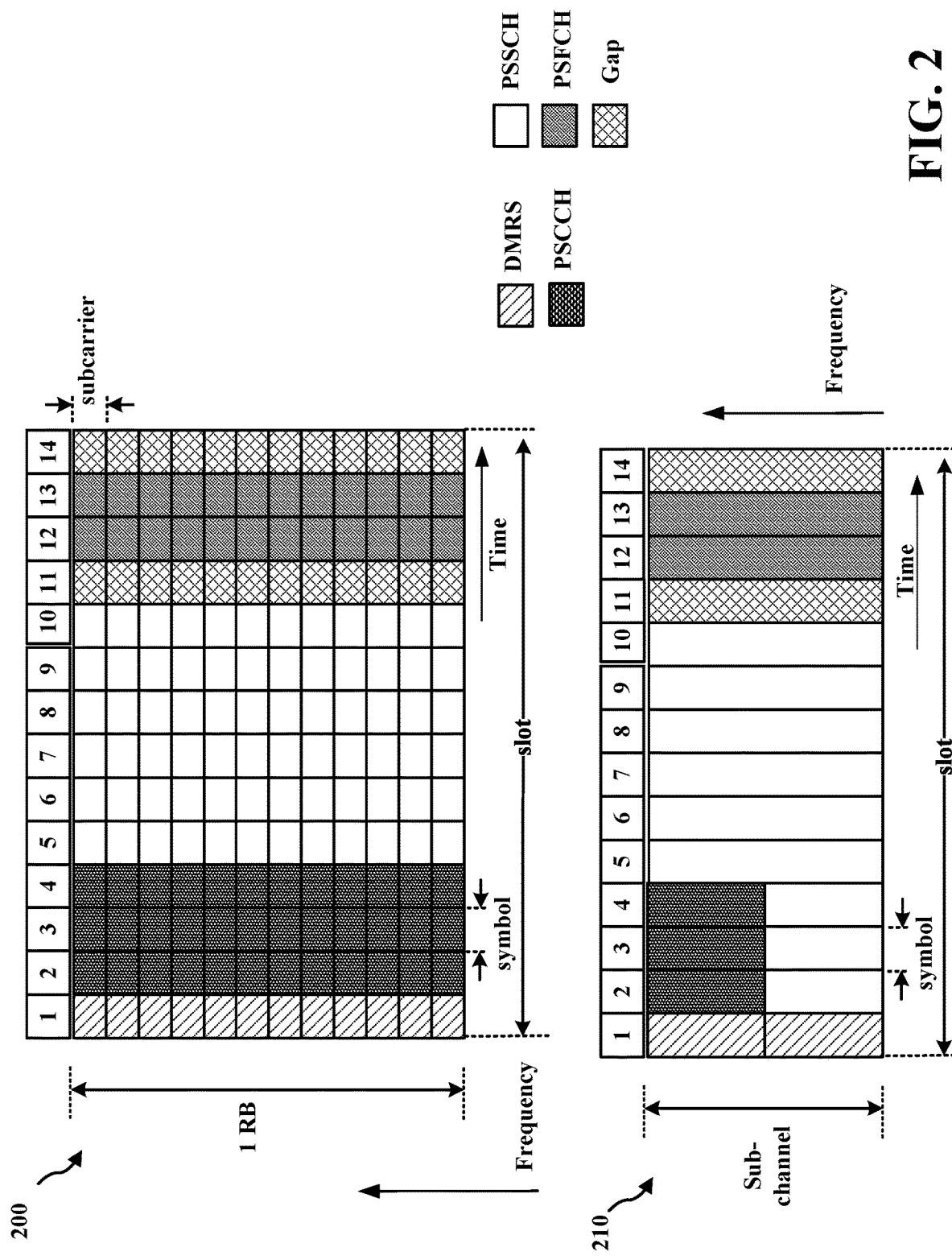
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols may be CP orthogonal frequency division multiplexing (OFDM) (CP-OFDM) symbols. The symbols may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>Δf = $2^μ · 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^μ$ slots/subframe. The subcarrier spacing may be equal to $2^μ*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIG. 2 provides an example of normal CP with 14 symbols per slot. Within a set of frames, there may be one or more different bandwidth parts (BWPs) that are frequency division multiplexed. Each BWP may have a particular numerology and CP (normal or extended).

Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
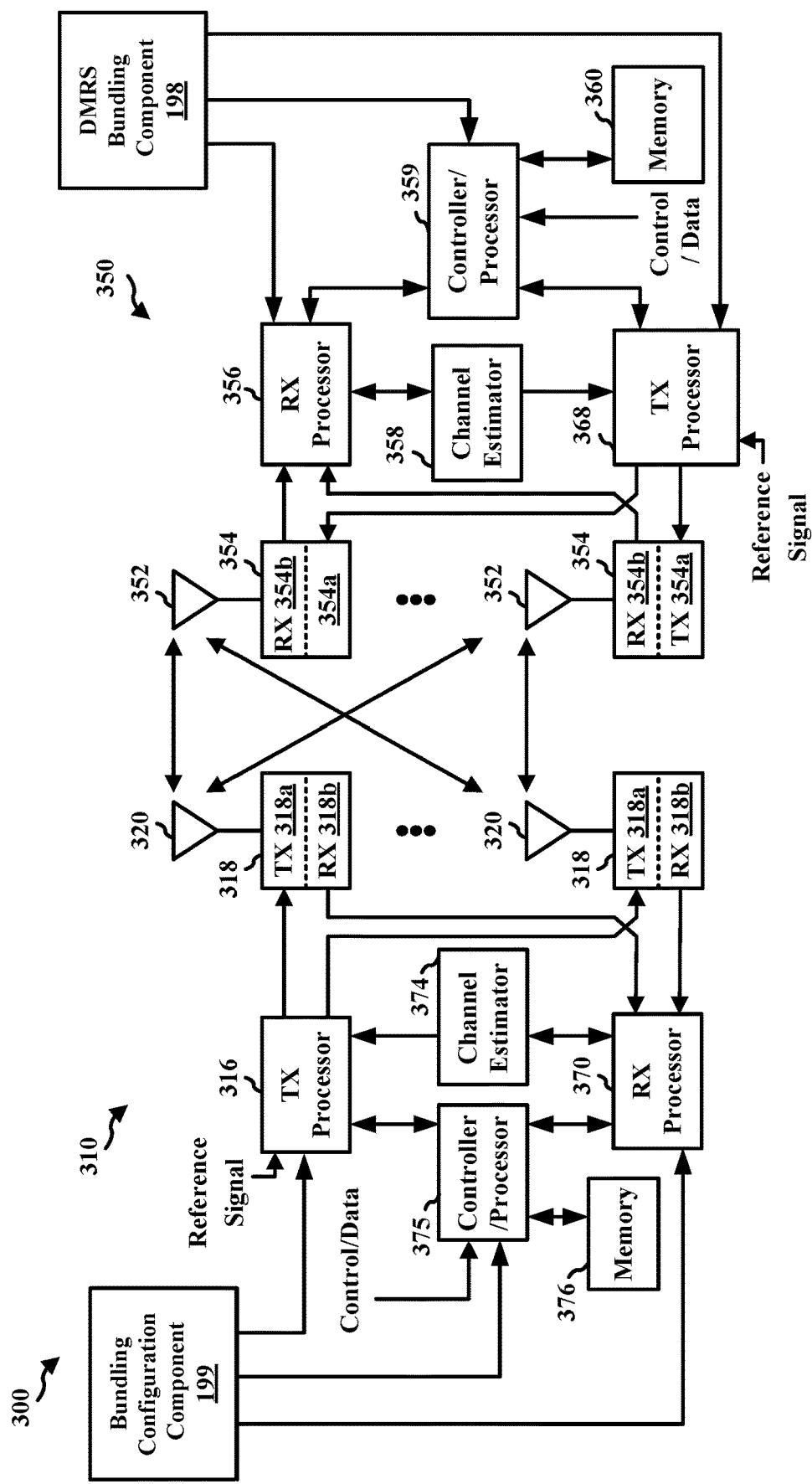
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350. The communication may be based on sidelink or an access link. In some examples, the wireless communication devices 310, 350 may communicate based on V2X or other D2D communication. In other aspects, the wireless communication devices 310, 350 may communicate over an access link based on uplink and downlink transmissions. The communication may be based on sidelink using a PC5 interface (e.g., between two UEs). The communication may be based on an access link using a Uu interface (e.g., between a base station and a UE). The wireless communication devices 310, 350 may comprise a UE, an RSU, a base station, etc. In some implementations, the first wireless communication device 310 may correspond to a base station and the second wireless communication device 350 may correspond to a UE.

As shown in FIG. 3, the first wireless communication device 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example second wireless communication device 350 includes antennas 352, a transceiver 354 including a transmitter 354a and a receiver 354b, an RX processor 356, a channel estimator 358, a controller/processor 359, memory 360, and a TX processor 368. In other examples, the first wireless communication device 310 and/or the second wireless communication device 350 may include additional or alternative components.

Packets may be provided to the controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318a. Each transmitter 318a may modulate a radio frequency (RF) carrier with a respective spatial stream for transmission.

At the second wireless communication device 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by the channel estimator 358. The soft decisions are then decoded and deinterleaved to recover the data and control signals that were originally transmitted by the first wireless communication device 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by the first wireless communication device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The transmission is processed at the first wireless communication device 310 in a manner similar to that described in connection with the receiver function at the second wireless communication device 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the DMRS bundling component 198 of FIG. 1.

At least one of the TX processor 316, the RX processor 370, and the controller/processor 375 may be configured to perform aspects in connection with the bundling configuration component 199 of FIG. 1.

Figure 4:
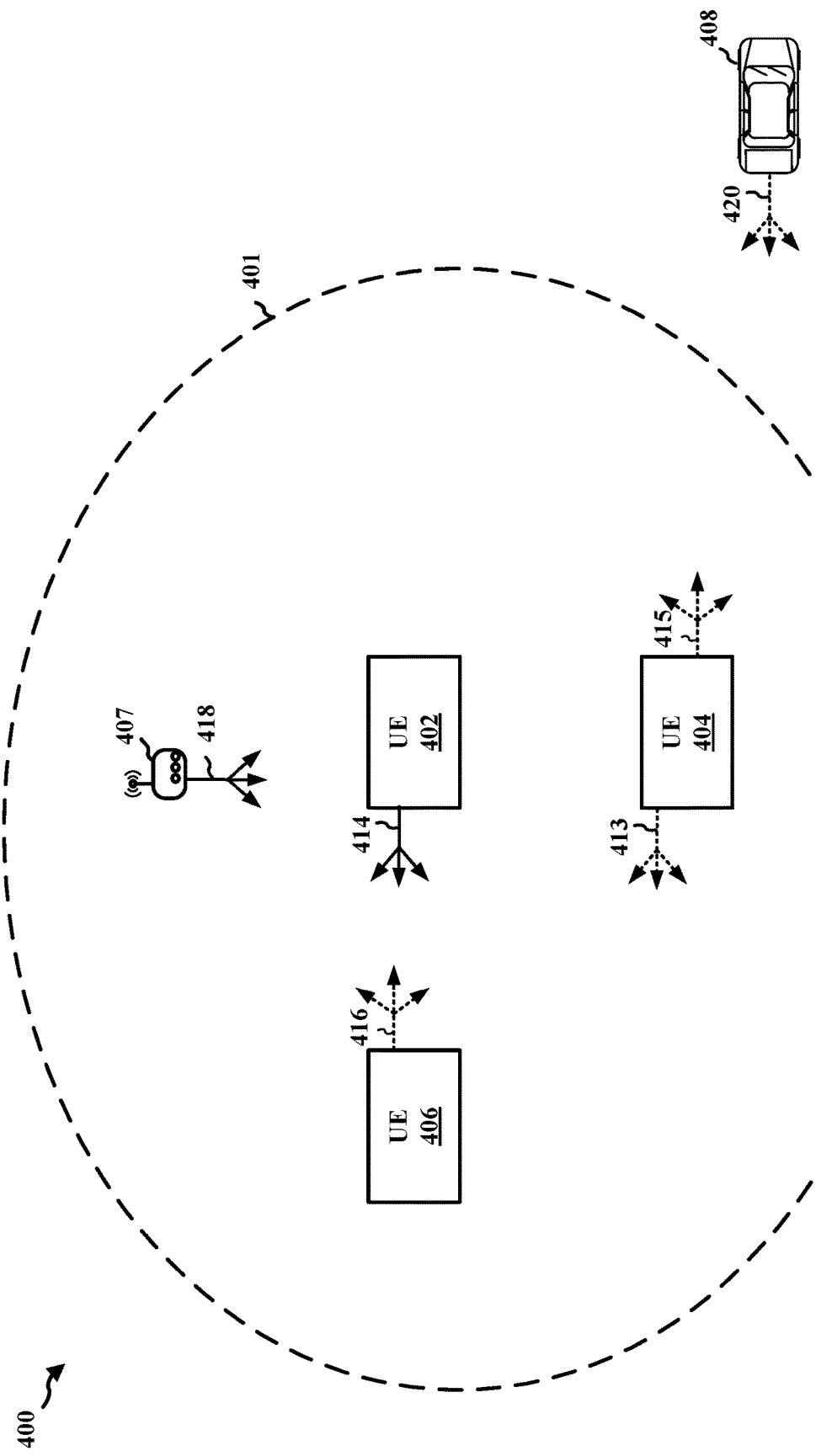
FIG. 4 illustrates example aspects of sidelink communication between devices, in accordance with aspects presented herein.

FIG. 4 illustrates an example 400 of sidelink communication between devices, as presented herein. The communication may be based on a slot structure comprising aspects described in connection with FIG. 2 or another sidelink structure. For example, a first UE 402 may transmit a sidelink transmission 414, e.g., comprising a control channel (e.g., PSCCH) and/or a corresponding data channel (e.g., PSSCH), that may be received by a second UE 404, a third UE 406, and/or a fourth UE 408. The sidelink transmission 414 may be received directly from the first UE 402, e.g., without being transmitting through a base station. Additionally, or alternatively, an RSU 407 may receive communication from and/or transmit communication to the UEs 402, 404, 406, 408. As shown in FIG. 4, the RSU 407 may transmit a sidelink transmission 418 that is received directly from the RSU 407.

The UEs 402, 404, 406, 408 and/or the RSU 407 may each be capable of operating as a transmitting device in addition to operating as a receiving device. Thus, the second UE 404 is illustrated as transmitting sidelink transmissions 413, 415, the third UE 406 is illustrated as transmitting a sidelink transmission 416, and the fourth UE 408 is illustrated as transmitting a sidelink transmission 420. One or more of the transmissions 413, 414, 415, 416, 418 may be broadcast or multicast to nearby devices. For example, the first UE 402 may transmit communication intended for receipt by other UEs within a range 401 of the first UE 402. In other examples, one or more of the transmissions 413, 414, 415, 416, 418 may be groupcast to nearby devices that are a member of a group. In other examples, one or more of the transmissions 413, 414, 415, 416, 418 may be unicast from one UE to another UE.

A sidelink transmission may provide sidelink control information (SCI) including information to facilitate decoding the corresponding data channel. The SCI may also include information that a receiving device may use to avoid interference. For example, the SCI may indicate reserved time resources and/or reserved frequency resources that will be occupied by the data transmission, and may be indicated in a control message from the transmitting device.

One or more of the UEs 402, 404, 406, 408 and/or the RSU 407 may include a DMRS bundling component, similar to the DMRS bundling component 198 described in connection with FIG. 1. One or more of the UEs 402, 404, 406, 408 and/or the RSU 407 may additionally or alternatively include a bundling configuration component, similar to the bundling configuration component 199 described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, and referring to the example of FIG. 1, a base station 102/180 may determine resources for sidelink communication and may allocate resources to different UEs 104 to use for sidelink transmissions. In this first mode, a UE receives the allocation of sidelink resources from the base station 102/180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether a selected sidelink resource has been reserved by other UE(s) before selecting the sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
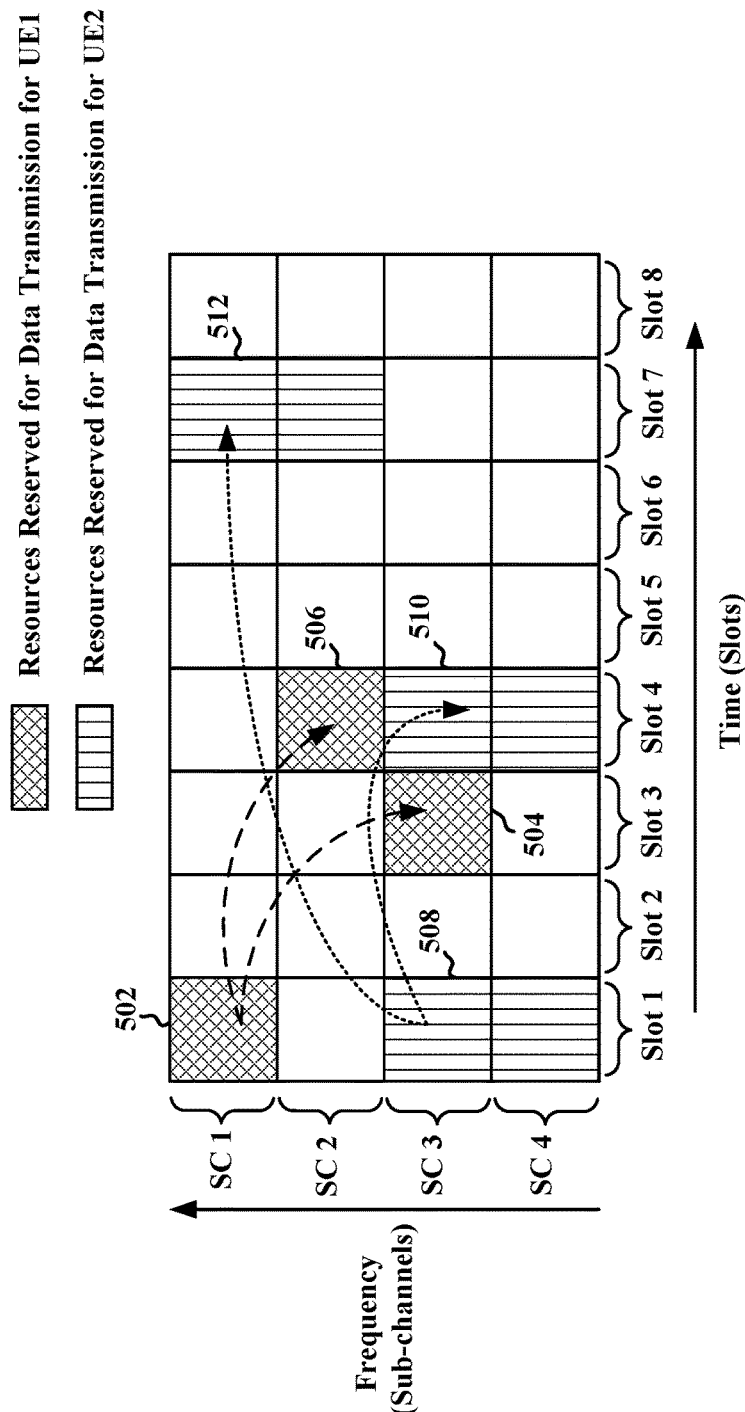
FIG. 5 illustrates examples of resource reservation for sidelink communication.

FIG. 5 is an example 500 of time and frequency resources showing reservations for sidelink transmissions, as presented herein. The resources may be comprised in a sidelink resource pool, for example. The resource allocation for each UE may be in units of one or more sub-channels in the frequency domain (e.g., sub-channels SC1 to SC 4), and may be based on one slot in the time domain (e.g., slots 1 to 8). The UE may also use resources in the current slot to perform an initial transmission, and may reserve resources in future slots for retransmissions. In the illustrated example of FIG. 5, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., a first data retransmission 504 and a second data retransmission 506). For example, the first UE may reserve sub-channels SC 3 at slot 3 and SC 2 at slot 4 for future retransmissions as shown by FIG. 5. The first UE then transmits information regarding which resources are being used and/or reserved by it to other UE(s). The first UE may do so by including the reservation information in a reservation resource field of the SCI, e.g., a first stage SCI.

FIG. 5 illustrates that a second UE ("UE2") reserves resources in sub-channels SC 3 and SC 4 at slot 1 for its current data transmission 508, reserves a first data retransmission 510 at slot 4 using sub-channels SC 3 and SC 4, and reserves a second data retransmission 512 at slot 7 using sub-channels SC 1 and SC 2, as shown by FIG. 5. Similarly, the second UE may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the second UE may transmit SCI reserving resources for data transmissions 508, 510, and 512.

There may be a timeline for a sensing-based resource selection. For example, the UE may sense and decode the SCI received from other UEs during a sensing window, e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

In some wireless communications systems, data transmissions by a transmitting device may be accompanied by demodulation reference signals, which may be used by a receiving device to support demodulating or otherwise decoding the data transmissions. The transmitting device and the receiving device may each use a precoding configuration, which may be negotiated or otherwise communicated between the transmitting device and the receiving device. Aspects of the precoding configuration may support encoding the data transmission by the transmitting device and decoding the encoded data transmission by the receiving device. In some cases, techniques for bundling of demodulation reference signals may be supported, and the receiving device may be configured to operate as if the same precoder is used by a transmitting device across the data channels of different scheduling units. For example, when demodulation reference signals are coherently transmitted over different time intervals or different antenna ports, demodulation reference signals over different time instants or antenna ports can be coherently filtered or otherwise processed by a receiving device to enhance the accuracy or efficiency of channel estimation for physical channel transmissions.

Demodulation reference signals may be transmitted in combination with physical control channel transmissions and physical data channel transmissions. For example, in sidelink communications, demodulation reference signals may be transmitted with PSCCH transmissions and/or PSSCH transmissions. With respect to PSCCH transmissions, demodulation reference signals may be present in PSCCH symbols and may be placed in a pattern. Referring to PSSCH transmissions, demodulation reference signals may be present in 2 symbol, 3 symbol, and 4 symbol DMRS patterns that may be configured or preconfigured. For example, a transmitting device may select a DMRS pattern and signal the selected DMRS pattern to a receiving device using SCI (e.g., a first stage SCI). Similar to the DMRS resource elements of a PSCCH transmission, the DMRS resource elements of a PSSCH transmission may be drawn from (or derived from) a Gold sequence.

An antenna port may be defined by a transmitted reference signal (e.g. a demodulation reference signal for sidelink communication). The receiving device can use a reference signal (e.g., the demodulation reference signal) transmitted on an antenna port to estimate the channel for this antenna port. The channel estimate can subsequently be used for decoding data transmitted on the same antenna port. For example, the demodulation reference signal may be used for channel estimation to decode data transmitted on the same antenna port.

In some examples, techniques for bundling of demodulation reference signals may be supported. When demodulation reference signals are coherently transmitted over different slots, the demodulation reference signals may be coherently filtered by the receiving device to increase the accuracy of the channel estimation for physical channel transmissions (e.g., sidelink transmissions). Improving the accuracy of the channel estimation may result in improving the decoding rate of data at the receiving device.

Figure 6:
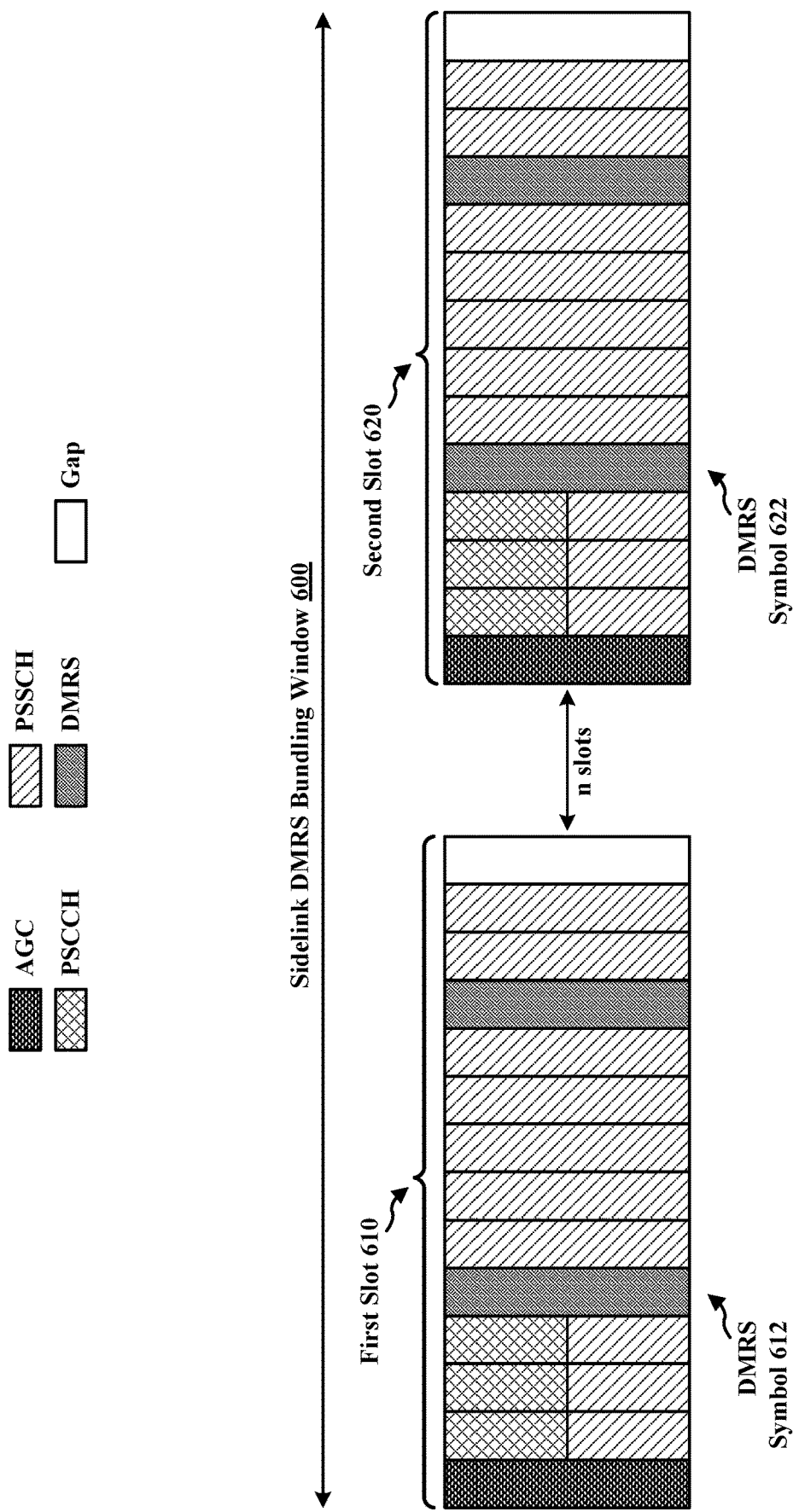
FIG. 6 illustrates an example sidelink DMRS bundling window including slots containing DMRS that may be used for channel estimation, in accordance with the teachings disclosed herein.

FIG. 6 illustrates an example sidelink DMRS bundling window 600 including slots containing DMRS that may be used for channel estimation, as presented herein. Sidelink DMRS bundling may be used in scenarios to improve coverage extension. For example, a transmitting device may transmit repetitions of a signal that may be received by a receiving device. The receiving device may combine the repetitions to increase the gain of the signal, which may increase the decoding rate of the signal. Sidelink DMRS bundling may also be used to improve the accuracy of the channel estimation.

However, the ability of a sidelink UE to perform sidelink DMRS bundling may be based on an ability of the sidelink UE to maintain phase continuity across transmissions. In some examples, the ability of the sidelink UE to maintain phase continuity may depend on whether the transmissions are contiguous (e.g., back-to-back) or within a threshold duration (e.g., a quantity of symbols, a quantity of slots, or a quantity of frames). In some examples, the ability of the sidelink UE to maintain phase continuity may depend on if the transmitting UE switched to a receiving mode between the transmissions, or switched to transmitting a different signal between the transmissions.

In the illustrated example of FIG. 6, a first slot 610 includes a first slot DMRS symbol 612 and a second slot 620 includes a second slot DMRS symbol 622. A receiving device may combine the DMRS from the first slot DMRS symbol 612 and the second slot DMRS symbol 622 to improve channel estimation across the slots of the sidelink DMRS bundling window 600.

The first slot 610 and the second slot 620 may be separated by n slots. In examples in which the value of n is zero, the first slot 610 and the second slot 620 may be referred to as back-to-back slots or consecutive slots.

To perform sidelink DMRS bundling, particular parameters related to the slots may be assumed. For example, the channel within the sidelink DMRS bundling window 600 may be assumed to be the same. Thus, sidelink DMRS bundling may be performed in low mobility scenarios with slow changing channels. For example, in a low mobility scenario, the channel may change slowly due to low Doppler effect.

In the illustrated example of FIG. 6, the first slot 610 may carry sidelink data that is transmitted by a transmitting UE to a receiving UE over a channel matrix H. The first slot 610 may be received by the receiving UE as a first received signal ($y_1$). Equation 1 (below) may describe the relationship between a first transmitting signal ($x_1$) (e.g., at the transmitting UE) and the first received signal ($y_1$) at the receiving UE.

$$y_1 = H \cdot P x_1 + n_1 \quad \text{Equation 1:}$$

In Equation 1, the term "$x_1$" represents the first signal being transmitted by the transmitting UE, the term "P" represents adjustments due to hardware at the transmitting UE and may be indicated as a precoding matrix, the term "H" represents the channel, and the term "$n_1$" represents thermal noise at the receiving UE (e.g., due to the receiving circuitry). As shown in Equation 1, the first signal $x_1$ is adjusted by the precoding matrix P at the transmitting UE, which then travels through the channel H, and may be modified by the thermal noise $n_1$ at the receiving device, before being received as the first received signal $y_1$. The receiving UE may then attempt to recover the first signal $x_1$ from the first received signal $y_1$.

The transmitting UE may then repeat the transmission of the first signal $x_1$, for example, to facilitate coverage extension. For example, the second slot 620 may carry a repetition of the sidelink data of the first slot 610. The second slot 620 may be received by the receiving UE as a second received signal ($y_2$). Equation 2 (below) may describe the relationship between a second transmitting signal ($x_2$) and the second received signal ($y_2$) at the receiving UE.

$$y_2 = D_r \cdot H \cdot D_t \cdot P x_2 + n_2 \qquad \text{Equation 2:}$$

Similar to the example of Equation 1, in Equation 2, the term "$x_2$" represents the second signal being transmitted by the transmitting UE, the term "P" represents adjustments due to hardware at the transmitting UE and may be indicated as a precoding matrix, the term "H" represents the channel, and the term "$n_2$" represents thermal noise at the receiving UE (e.g., due to the receiving circuitry). Additionally, the second signal $x_2$ may be adjusted by the same precoding matrix P at the transmitting UE, which then travels through the channel H, and may be modified by the thermal noise $n_2$ at the receiving device, before being received as the second received signal $y_2$. However, due to changes in the environment (e.g., temperature changes, etc.), the second received signal $y_2$ may be further modified when traveling through the same channel matrix H. As shown in Equation 2, the term "$D_r$" represents RF changes at the receiving UE, and the term "$D_t$" represents RF changes at the transmitting UE. The respective RF changes may be described by a matrix. For example, Equation 3 (below) may define RF changes at each antenna port. In $$D = \text{diag}(\alpha_1 e^{j\theta_1}, \dots) \qquad \text{Equation 3:}$$

Equation 3, the matrix D indicates the amplitude jump ($\alpha$) and the phase jump ($\theta$) at each antenna port. The amplitude jump $\alpha$ and the phase jump $\theta$ may be due to characteristics of the hardware at the sidelink UE. The amplitude jump $\alpha$ may be caused by the transmitter circuitry. For example, even though the transmit power may be the same across the first slot 610 and the second slot 620, the hardware at the sidelink UE may be unable to maintain the power across the slots. The phase jump $\theta$ may indicate a rotation that is applied to each signal.

Thus, the matrix $D_t$ represents the amplitude jumps and/or phase jumps at each antenna port of the transmitting UE. Similarly, the matrix $D_r$ represents the amplitude jumps and/or phase jumps at each antenna port of the receiving UE.

As described above, sidelink DMRS bundling may facilitate performing channel estimation across transmissions. Thus, it may be appreciated that the channel conditions (e.g., the channel matrix H) across the transmissions may be the same. That is, when performing sidelink DMRS bundling, the receiving UE may be configured to operate as if the channel conditions at a first transmission and a second transmission are the same. Otherwise, combining the DMRS from the first transmission and the second transmission would not result in an accurate estimate of channel conditions.

Sidelink DMRS bundling may be characterized as strong bundling, weak bundling, or no bundling. For strong bundling, the relationship between the RF changes at the receiving UE (e.g., the receiving UE matrix $D_r$) and the RF changes at the transmitting UE (e.g., the transmitting UE matrix $D_t$) may be defined by Equation 4 (below).

$$D_r = D_t = I \qquad \text{Equation 4:}$$

In Equation 4, the term "I" represents the identity matrix. That is, the diagonal elements of the transmitting UE matrix $D_t$ and the diagonal elements of the receiving UE matrix $D_r$ are equal to 1 while the other elements of the transmitting UE matrix $D_t$ and the receiving UE matrix $D_r$ are equal to zero. Thus, for strong bundling, it is assumed that the transmitting UE and the receiving UE each have the capability to maintain phase continuity. When sidelink DMRS bundling is characterized as strong, then the second received signal may be characterized using Equation 5 (below).

$$y_2 = H \cdot P x_2 + n_2 \qquad \text{Equation 5:}$$

In such scenarios, the receiving UE has the ability to estimate the channel matrix H based on the first received signal $y_1$ and the second received signal $y_2$. For example, as the second signal $x_2$ is a repetition of the first signal $x_1$ (e.g., $x_2 = x_1$), the receiving UE may use the two received signals $y_1$ and $y_2$ to estimate the channel matrix H.

However, due to a number of factors (e.g., environmental factors, hardware capabilities, etc.), the transmitting UE and the receiving UE may be unable to maintain phase continuity. That is, at least one of the transmitting UE matrix $D_t$ and the receiving UE matrix $D_r$ is not equal to the identity matrix and, thus, the second received signal $y_2$ includes an additional unknown term along with the channel matrix H. In such examples, the sidelink DMRS bundling may be characterized as weak.

If the receiving UE does not account for the amplitude jump and the phase jump between the first transmission and the second transmission, performing the sidelink DMRS bundling may not result in a gain. However, if the receiving UE is able to determine or estimate the elements of the matrix D, then the receiving UE may perform the sidelink DMRS bundling, which may improve the accuracy of the channel estimation.

When two UEs have the capability to maintain phase continuity across transmissions, strong bundling may be assumed and, thus, the diagonal elements of the transmitting UE matrix $D_t$ and the diagonal elements of the receiving UE matrix $D_r$ are each equal to 1 while the other elements of the transmitting UE matrix $D_t$ and the receiving UE matrix $D_r$ are equal to zero, as described in connection with Equation 4 (above). Additionally, aspects of a first transmission and a second transmission may also be assumed to be true. For example, the first transmission and the second transmission may each be associated with the same transmission power, the same frequency domain resource allocation, the same DMRS antenna ports, the same codebook, the same transmit spatial parameters, and the same timing advance. That is, if there is a change in one or more of the aspects (e.g., the transmission power, the frequency domain resource allocation, the DMRS antenna ports, the codebook, the transmit spatial parameters, and/or the timing advance), then phase continuity may not be maintained between the first transmission and the second transmission.

Additionally, even if the particular aspects are the same across the first transmission and the second transmission, phase continuity may not be maintained based on a time gap between the first transmission and the second transmission and/or a change in traffic direction. For example, phase continuity may be maintained between the first transmission and the second transmission when the transmissions are contiguous (e.g., back-to-back) or when a time gap between the first transmission and the second transmission is within a threshold duration (e.g., a particular quantity of symbols, a particular quantity of slots, or a particular quantity of frames). That is, as the time gap between the first transmission and the second transmission increases, a common phase error (CPE) may be introduced that may result in being unable to combine the demodulation reference signals across transmissions.

In some examples, the ability of the sidelink UE to maintain phase continuity may depend on if the transmitting UE switches to a receiving mode between the transmissions, or switches to transmitting a different signal between the transmissions. For example, if the transmitting UE switches to a receiving mode between the first transmission and the second transmission, then aspects of the RF circuitry of the transmitting UE may change, which may increase phase jump between the first transmission and the second transmission at the receiving UE.

Aspects disclosed herein provide techniques for enabling a transmitting UE to signal a structure of the transmitting UE matrix $D_t$. The structure of the transmitting UE matrix $D_t$ may include a full matrix, a diagonal matrix, a bi-directional matrix, or an identity matrix. For example, for a sidelink UE with two antenna ports, the transmitting UE matrix $D_t$ may be a 2×2 matrix and characterized by Equation 6 (below).

$$D_t = \begin{bmatrix} d_{11} & d_{12} \\ d_{21} & d_{22} \end{bmatrix} \quad \text{Equation 6}$$

In the Equation 6, the terms "$d_{11}$", "$d_{12}$", "$d_{21}$," and "$d_{22}$" each represent different elements of the transmitting UE matrix $D_t$ and represent a respective amplitude jump and phase jump. When the structure of the transmitting UE matrix $D_t$ is an identity matrix, then the values of the diagonal elements are each equal to 1 while the remaining elements of the transmitting UE matrix $D_t$ are equal to zero. For example, the diagonal elements $d_{11}$ and $d_{22}$ may be equal to one and the remaining elements (e.g., the elements $d_{12}$ and $d_{21}$) may be equal to zero. In such examples, the receiving UE may perform sidelink DMRS bundling based on Equation 1 and Equation 5 (above).

In examples in which the structure of the transmitting UE matrix $D_t$ is a diagonal matrix, then two of the elements (e.g., elements $d_{12}$ and $d_{21}$) are equal to zero and the other two elements (e.g., elements $d_{11}$ and $d_{22}$) are equal to non-zero values. In such examples, the receiving UE is tasked with estimating the two non-zero values before being able to perform sidelink DMRS bundling.

In examples in which the structure of the transmitting UE matrix $D_t$ is a bi-directional matrix, then one of the elements (e.g., element $d_{21}$) is equal to zero and the other three elements (e.g., elements $d_{11}$, $d_{12}$, and $d_{22}$) are equal to non-zero values. In such examples, the receiving UE is tasked with estimating the three non-zero values before being able to perform sidelink DMRS bundling.

In examples in which the structure of the transmitting UE matrix $D_t$ is a full matrix, then each of the elements (e.g., elements $d_{11}$, $d_{12}$, $d_{21}$, and $d_{22}$) is equal to non-zero values. In such examples, the receiving UE is tasked with estimating the four non-zero values before being able to perform sidelink DMRS bundling.

It may be appreciated that the transmitting UE provides the structure of the transmitting UE matrix $D_t$ as this is information that is available to the transmitting UE. Similarly, the receiving UE is aware of the structure of its receiving UE matrix $D_r$. For example, the receiving UE may be configured to operate at particular powers and/or phases and, thus, has the ability to determine the values of the elements of the receiving UE matrix $D_r$.

Figure 7:
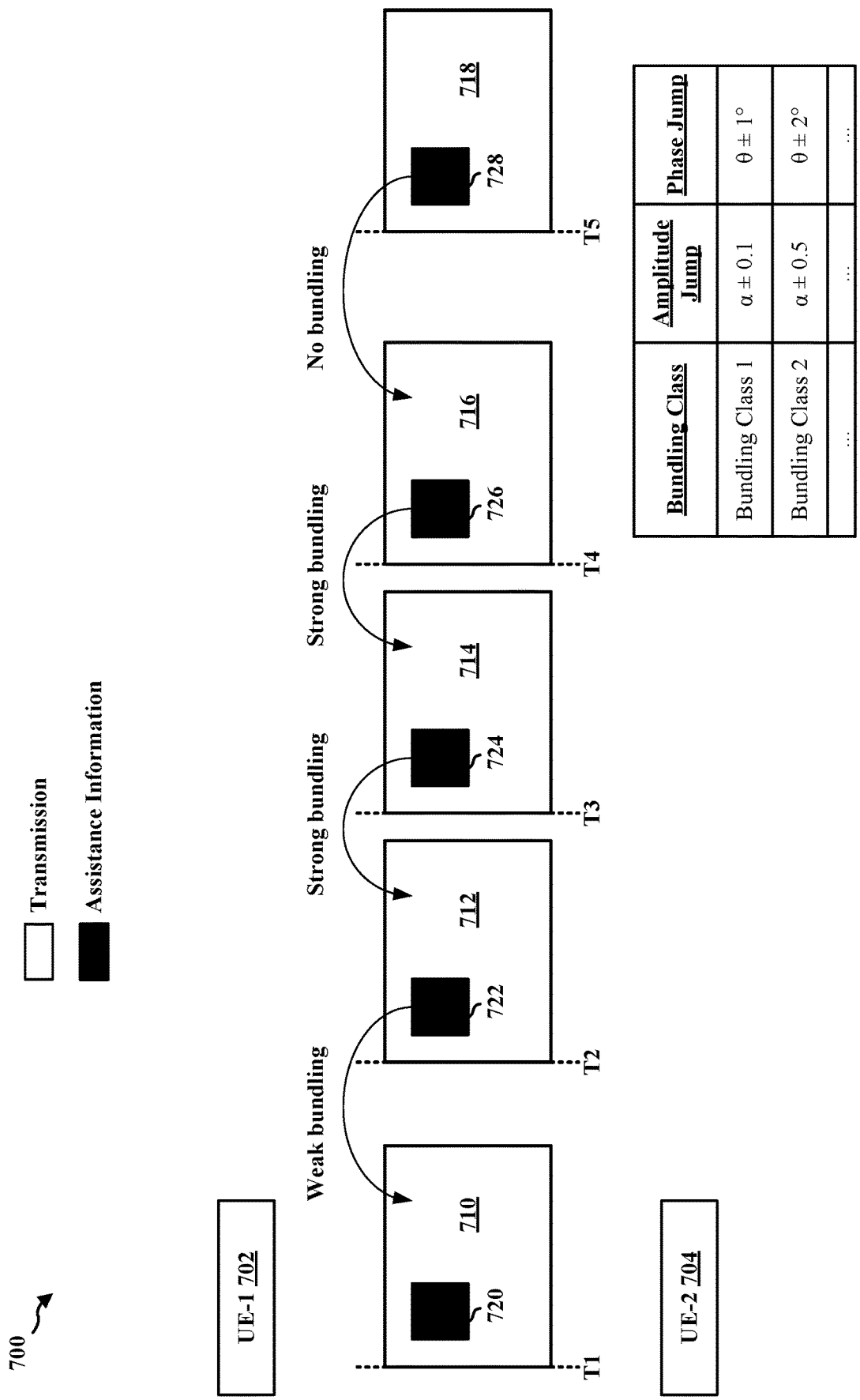
FIG. 7 illustrates a sequence of sidelink transmissions from a first UE to a second UE, in accordance with the teachings disclosed herein.

FIG. 7 illustrates a sequence 700 of sidelink transmissions from a first UE 702 ("UE-1") to a second UE 704 ("UE-2"), as presented herein. As shown in FIG. 7, the first UE 702 transmits five transmissions that are received by the second UE 704. For example, the first UE 702 transmits a first transmission 710 at a first time T1, transmits a second transmission 712 at a second time T2, transmits a third transmission 714 at a third time T3, transmits a fourth transmission 716 at a fourth time T4, and transmits a fifth transmission 718 at a fifth time T5. In some examples, the five transmissions 710, 712, 714, 716, 718 may correspond to respective slots of a sidelink transmission.

As described above, demodulation reference signals may be used to estimate channel conditions associated with a transmission. If phase continuity can be maintained by the first UE 702 and the second UE 704, then demodulation reference signals across transmissions may be combined to estimate the channel (e.g., the channel matrix H). Using demodulation reference signals across transmissions (e.g., performing sidelink DMRS bundling) may improve accuracy of the channel estimate. The second UE 704 may also be able to improve the decoding rate of transmissions with the better channel estimate.

In the illustrated example of FIG. 7, the five transmissions 710, 712, 714, 716, 718 may be repetitions and carry the same signal. When channel conditions remain the same across transmissions, then demodulation reference signals may be combined from the respective transmissions to estimate the channel conditions (e.g., to perform sidelink DMRS bundling). That is, when phase continuity is maintained across two transmissions (e.g., the first transmission 710 and the second transmission 712), then demodulation reference signals from the two transmissions may be combined to estimate the channel matrix H associated with the two transmissions. However, even if the channel remains the same across the two transmissions, in some examples, a phase jump between the two transmissions may result in limited or negligible gains when performing sidelink DMRS bundling across the two transmissions.

In the illustrated example of FIG. 7, the first UE 702 transmits assistance information that the second UE 704 may use to determine how to perform sidelink DMRS bundling. In some examples, the assistance information may indicate that the first UE 702 has the capability to maintain phase continuity across transmissions. The assistance information may additionally or alternatively indicate one or more aspects associated with the transmissions, such as transmission power, a frequency domain resource allocation, DMRS antenna ports, a codebook, transmit spatial parameters, and/or a timing advance. For example, in the example of FIG. 7, the first transmission 710 may include first assistance information 720 that indicates to the second UE 704 that the first UE 702 has the ability to maintain phase continuity across the five transmissions 710, 712, 714, 716, 718.

In some examples, the assistance information may indicate a bundling relationship and/or a structure of the transmitting UE matrix $D_t$ for the transmission. For example, the assistance information may indicate that the bundling relationship between two transmissions is strong, is weak, or that there is no bundling. As shown in FIG. 7, the second transmission 712 includes second assistance information 722 that indicates "weak bundling" between the second transmission 712 and the first transmission 710, the third transmission 714 includes third assistance information 724 that indicates "strong bundling" between the third transmission 714 and the second transmission 712, the fourth transmission 716 includes fourth assistance information 726 that indicates "strong bundling" between the fourth transmission 716 and the third transmission 714, and the fifth transmission 718 includes fifth assistance information 728 that indicates "no bundling" between the fifth transmission 718 and the fourth transmission 716.

In some examples, the assistance information may indicate the structure of the transmitting UE matrix $D_t$. For example, the assistance information may indicate the structure of the transmitting UE matrix $D_t$ is an identity matrix, that the structure of the transmitting UE matrix $D_t$ is a diagonal matrix, that the structure of the transmitting UE matrix $D_t$ is a bi-directional matrix, or that the structure of the transmitting UE matrix $D_t$ is a full matrix.

In some examples, the assistance information may indicate values of the elements of the transmitting UE matrix $D_t$. For example, the assistance information may provide amplitude jumps and/or phase jumps between transmissions. In some examples, the assistance information may indicate ranges of values for the amplitude jumps and/or the phase jumps. For example, the assistance information may indicate that the absolute value of the difference between a first phase and a second phase is less than a delta (e.g., $|\theta_i-\theta_j|<\Delta$).

In some examples, the amplitude jumps and/or the phase jumps may be grouped into different classes. In some such examples, the assistance information may indicate a bundling class and the second UE 704 may determine the amplitude jumps and/or the phase jumps based on the indicated bundling class. For example, a first bundling class may indicate a range of amplitude jumps within 0.1 (e.g., $\alpha\pm0.1$) and a range of phase jumps within 1 degree (e.g., $\theta\pm1°$), a second bundling class may indicate a range of amplitude jumps within 0.5 (e.g., $\alpha\pm0.5$) and a range of phase jumps within 2 degrees (e.g., $\theta\pm2°$), etc.

In the illustrated example of FIG. 7, the first UE 702 transmits the assistance information with each transmission. In other examples, the first UE 702 may transmit the assistance information when there is a change in the assistance information or may forego transmitting the assistance information when the assistance information is the same between two transmissions. For example, the first UE 702 may transmit the third assistance information 724 as the bundling relationship changes from "weak bundling" to "strong bundling." The first UE 702 may forgo transmitting the fourth assistance information 726 as the bundling relationship remains strong between the fourth transmission 716 and the third transmission 714.

The first UE 702 may transmit the assistance information via sidelink control information (SCI). For example, the first UE 702 may transmit the assistance information using first stage SCI ("SCI-1") and/or using second stage SCI ("SCI-2"). In some examples, the first UE 702 may transmit the assistance information via a MAC control element (MAC-CE). In some examples, the first UE 702 may transmit the assistance information via RRC signaling with the second UE 704, such as while performing connection establishment procedures and/or connection re-establishment procedures.

The second UE 704 may use the assistance information to update how to process signals and to determine how to perform the sidelink DMRS bundling. For example, based on the third assistance information 724, the second UE 704 may determine that there is a strong bundling relationship between the second transmission 712 and the third transmission 714. In such examples, the second UE 704 may determine that the diagonal elements of the transmitting UE matrix $D_t$ and the diagonal elements of the receiving UE matrix $D_r$ are each equal to 1, that the remaining elements of the transmitting UE matrix $D_t$ and the receiving UE matrix $D_r$ are equal to zero, and that the channel matrix H between the second transmission 712 and the third transmission 714 may be estimated based on the received signal associated with the third transmission (e.g., the second received signal $y_2$) and the received signal associated with the second transmission (e.g., the first received signal $y_1$). The second UE 704 may then use the estimate of the channel matrix H to decode the second transmission 712 and the third transmission 714.

In examples in which the assistance information indicates that there is a weak bundling relationship between two transmissions, the receiving UE may first determine the matrix D modifying the channel matrix H and then estimate the channel matrix H. For example, after receiving the second transmission 712 and the second assistance information 722, the second UE 704 may determine that there is a weak bundling relationship between the first transmission 710 and the second transmission 712. In some such examples, the second UE 704 may use the structure of the transmitting UE matrix $D_t$ to determine which elements of the transmitting UE matrix $D_t$ to calculate. The second UE 704 may also use the available information regarding its receiving UE matrix $D_r$ to then estimate the channel matrix H.

In examples in which the assistance information indicates that there is a no bundling relationship between two transmissions, the receiving UE may perform per-transmission channel estimation. For example, after receiving the fifth transmission 718 and the fifth assistance information 728, the second UE 704 may determine that there is no bundling relationship between the fourth transmission 716 and the fifth transmission 718. In some such examples, the second UE 704 may use the DMRS of the fourth transmission 716 to estimate the channel matrix H of the fourth transmission 716. The second UE 704 may also use the DMRS of the fifth transmission 718 to estimate the channel matrix H of the fifth transmission 718.

In some examples, the transmitting UE may have the ability to transmit the structure of the transmitting UE matrix $D_t$, but may be unable to provide values of the elements (e.g., may not be able to provide the amplitude jumps and/or phase jumps). For example, the change in amplitude and/or phase between a first transmission and a second transmission may be random (e.g., within the capabilities of the transmitting UE). For example, the transmitting UE may be able to determine that the structure of the transmitting UE matrix $D_t$ is a diagonal matrix and may also know a range of values for the amplitude jump and/or the phase jump. However, the values of the amplitude jump and/or the phase jump may be random within the capabilities of the transmitting UE. The values of the amplitude jump and/or the phase jump may depend on the time gap between the first transmission and the second transmission. For example, as the duration of the time gap increases, there may be more variation in the amplitudes and/or phases associated with the first transmission and the second transmission.

In some examples, the values of the amplitude jump and/or the phase jump may depend on whether the transmitting UE and/or the receiving UE changes modes between the first transmission and the second transmission. For example, in a first scenario, the transmitting UE may switch to a receiving mode to receive a transmission between transmitting the first transmission and the second transmission. In a second scenario, the transmitting UE may transmit a different transmission between the first transmission and the second transmission. For example, the transmitting UE may transmit an uplink transmission or another initial sidelink transmission between transmitting the first transmission and the second transmission. In a similar manner, the receiving UE may switch to a transmitting mode between receiving the first transmission and the second transmission (e.g., a third scenario), or may receive a different transmission between the first transmission and the second transmission (e.g. a fourth scenario). In each of these scenarios, aspects of the RF circuitry at the respective UE may change (e.g., an RF change), which may result in jumps in the amplitude and/or phase across transmissions.

Aspects disclosed herein include techniques for the transmitting UE to insert an additional reference signal with a transmission. The receiving UE may use the additional reference signal to estimate the amplitude jump and/or the phase jump between two transmissions. The receiving UE may use the additional reference signal to estimate the change in amplitude and/or phase between the first transmission and the second transmission. The receiving UE may then use the estimated change to determine the matrix D modifying the channel matrix H and then estimate the channel matrix H.

In some examples, the additional reference signal may include a phase tracking reference signal (PTRS). The PTRS may be used to estimate phase noise, for example, introduced by the transmitting UE and/or the receiving UE. For example, if the receiving UE determines it is able to maintain phase continuity (e.g., the diagonal elements of the receiving UE matrix $D_r$ are equal to one and the remaining elements are equal to zero), then the receiving UE may use the PTRS to estimate the elements of the transmitting UE matrix $D_t$. In other examples, the receiving UE may be unable to maintain phase continuity while the transmitting UE is able to maintain phase continuity (e.g., the diagonal elements of the transmitting UE matrix $D_t$ are equal to one and the remaining elements are equal to zero). In such examples, the receiving UE may use the PTRS to estimate the elements of the receiving UE matrix $D_r$.

Figures 8A, 8B, 8C:
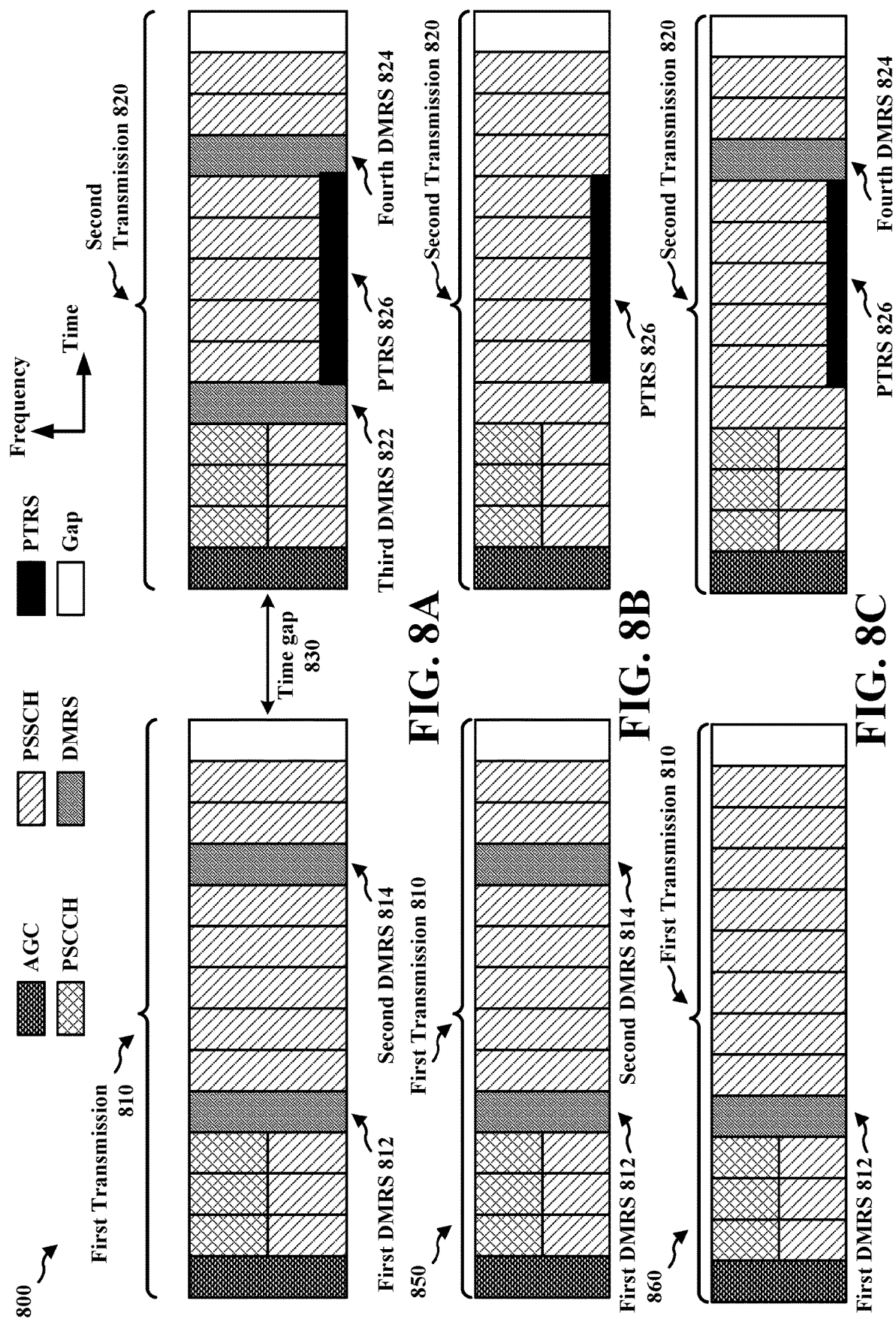
FIG. 8A illustrates an example including a first transmission and a second transmission after an occurrence of a phase discontinuity event, in accordance with the teachings disclosed herein.
FIG. 8B illustrates an example including a first DMRS reduction pattern associated with a first transmission and a second transmission, as presented herein, in accordance with the teachings disclosed herein.
FIG. 8C illustrates an example including a second DMRS reduction pattern associated with a first transmission and a second transmission, as presented herein, in accordance with the teachings disclosed herein.

In some examples, the transmitting UE may include the additional reference signal after detecting the occurrence of a phase discontinuity event. FIG. 8A illustrates an example 800 including a first transmission 810 and a second transmission 820 after an occurrence of a phase discontinuity event, as presented herein. In some examples, the first transmission 810 may correspond to a first slot of a sidelink transmission and the second transmission 820 may correspond to a second slot of the sidelink transmission. As shown in the example of FIG. 8A, the first transmission 810 and the second transmission 820 may be separated by a time gap 830. In some examples, assistance information (e.g., the example assistance information 720, 722, 724, 726, 728 of FIG. 7) may be carried by the PSCCH of the transmissions 810, 820.

In the illustrated example of FIG. 8A, a first UE, such as the example first UE 702 of FIG. 7, may transmit the first transmission 810 to a second UE, such as the example second UE 704 of FIG. 7. After transmitting the first transmission 810 and before transmitting the second transmission 820, the first UE may detect the occurrence of a phase discontinuity event. The occurrence of the phase discontinuity event may cause sidelink DMRS bundling between the first transmission 810 and the second transmission 820 to become weaker than a threshold. In some such examples, the including of the additional reference signal may assist in performing the sidelink DMRS bundling.

In some examples, a phase discontinuity event may include a threshold duration. For example, the first UE may determine that the time gap 830 fails to satisfy the threshold duration (e.g., the time gap 830 is not within a particular quantity of symbols, is not within a particular quantity of slots, or is not within a particular quantity of frames).

In some examples, the occurrence of the phase discontinuity event may include detecting a switch to a receiver mode between the transmitting of the first transmission 810 and the second transmission 820. For example, the first UE may switch its RF circuitry to facilitate receiving a transmission (e.g., a sidelink transmission or a downlink transmission) during the time gap 830.

In some examples, the occurrence of the phase discontinuity event may include detecting a switch to transmitting another transmission between the transmitting of the first transmission 810 and the second transmission 820. For example, the first UE may switch its RF circuitry to facilitate transmitting an uplink transmission during the time gap 830.

In some examples, the occurrence of the phase discontinuity event may include receiving an indication from the second UE that the second UE is unable to maintain phase continuity. For example, after receiving the first transmission 810 and before receiving the second transmission 820, the second UE may switch to a transmit mode to transmit a transmission or may switch to receive another transmission. In such examples, the second UE may switch its RF circuitry to accommodate the transmit mode or the receiving of another transmission. In such examples, the second UE may transmit an indication to the first UE indicating that the second UE is unable to maintain phase continuity.

As shown in FIG. 8A, the first UE transmits the second transmission 820 and includes PTRS 826 with the second transmission 820. The insertion of the PTRS 826 in the second transmission 820 may be triggered by the occurrence of the phase discontinuity event. The PTRS 826 may be low overhead. For example, the PTRS 826 may occupy locations at a low density in a frequency domain. In some examples, configuration information associated with the PTRS 826 may be pre-configured, such as via RRC signaling while performing a connection establishment procedure or a connection re-establishment procedure. In some examples, the configuration information associated with the PTRS 826 may be signaled, such as via assistance information (e.g., the example assistance information 720, 722, 724, 726, 728 of FIG. 7).

In some examples, the configuration information may include time and/or frequency density of the PTRS 826, may include a pattern of the PTRS 826, may include a sequence for sequence generation of the PTRS 826, and/or may include antenna ports associated with the PTRS 826. In some examples, aspects of the configuration information may be pre-configured while other aspects may be indicated at a different time. For example, the time and/or frequency density of the PTRS 826 may be pre-configured, while the pattern, the sequence, and the antenna ports may be indicated via the assistance information associated with a transmission. As an example, and referring to the example of FIG. 7, the first assistance information 720 may indicate a time and/or frequency density associated with PTRS of subsequent transmissions and the second assistance information 722 may indicate the presence of PTRS in the second transmission 712. The second assistance information 722 may also indicate the pattern, the sequence, and the antenna ports of the PTRS associated with the second transmission 712.

In some examples, the transmitting UE may omit or skip transmitting DMRS when sidelink DMRS bundling is configured and when transmitting additional reference signals (e.g., PTRS). As described above, DMRS may be used to facilitate channel estimation, and sidelink DMRS bundling may be performed when the channel conditions are expected to be the same across transmissions. In such examples, the additional signals (e.g., PTRS) may be used to estimate the amplitude jumps and/or the phase jumps and, thus, one or more DMRS may be omitted from a transmission.

For example, in the illustrated example of FIG. 8A, the first transmission 810 includes a first DMRS 812 (e.g., a DMRS symbol) and a second DMRS 814, and the second transmission 820 includes a third DMRS 822 and a fourth DMRS 824. In some examples, the assistance information may indicate a DMRS reduction pattern. FIG. 8B illustrates an example 850 including a first DMRS reduction pattern associated with the first transmission 810 and the second transmission 820, as presented herein. For example, the first DMRS reduction pattern may indicate that the first UE may omit or skip transmitting the third DMRS 822 and/or the fourth DMRS 824 of the second transmission 820. As shown in FIG. 8B, the first UE may transmit the first transmission 810 including the first DMRS 812 and the second DMRS 814, but the DMRS of the second transmission 820 is omitted. In some examples, the omitted or skipped DMRS (e.g., the third DMRS 822 and the fourth DMRS 824) may be replaced with data (e.g., PSSCH).

FIG. 8C illustrates an example 860 including a second DMRS reduction pattern associated with the first transmission 810 and the second transmission 820, as presented herein. For example, the second DMRS reduction pattern may indicate that the first UE may omit or skip transmitting the second DMRS 814 of the first transmission 810 and the third DMRS 822 of the second transmission 820. As shown in FIG. 8C, the first UE may transmit the first transmission 810 including the first DMRS 812 and the second transmission 820 including the fourth DMRS 824. The second UE may use the first DMRS 812 and the fourth DMRS 824 to detect variations in the channel between the first DMRS 812 and the fourth DMRS 824. The omitted or skipped DMRS (e.g., the second DMRS 814 and the third DMRS 822) may be replaced with data (e.g., PSSCH).

In some examples, the transmitting UE may determine to include the additional reference signal with each transmission associated with sidelink DMRS bundling. In some examples, the transmitting UE may include the additional reference signal with repetitions associated with sidelink DMRS bundling. For example, and referring to the example of FIG. 7, the transmitting UE may forego including the PTRS in the first transmission 710, but may include the PTRS in the repetitions of the first transmission 710 (e.g., the second transmission 712, the third transmission 714, the fourth transmission 716, and the fifth transmission 718).

FIG. 9A illustrates an example 900 including a first transmission 910 and a second transmission 920 each including an additional reference signal to facilitate sidelink DMRS bundling, as presented herein. In some examples, the first transmission 910 may correspond to a first slot of a sidelink transmission and the second transmission 920 may correspond to a second slot of the sidelink transmission. As shown in the example of FIG. 9A, the first transmission 910 and the second transmission 920 may be separated by a time gap 930. In some examples, assistance information (e.g., the example assistance information 720, 722, 724, 726, 728 of FIG. 7) may be carried by the PSCCH of the transmissions 910, 920.

In the illustrated example of FIG. 9A, the first transmission 910 includes a first DMRS 912 (e.g., a DMRS symbol), a second DMRS 914, and first PTRS 916. The second transmission 920 includes a third DMRS 922, a fourth DMRS 924, and second PTRS 926. As shown in FIG. 9A, each of the transmissions includes PTRS. That is, PTRS may be included when the DMRS bundling relationship is strong and weak.

In some examples, by including the PTRS in each of the transmissions, overhead associated with signaling the presence of the PTRS in a transmission and/or configuration information associated with a PTRS may be omitted. However, there is the increase in overhead associated with the presence of the PTRS in a transmission. For example, in the example of FIG. 8A in which the PTRS 826 is included in a transmission after the occurrence of a phase discontinuity event, in the example of FIG. 9A, each of the transmissions 910, 920 include PTRS 916, 926, respectively.

In some examples, the cost of including PTRS in each transmission may be offset by removing DMRS from a transmission. For example, the assistance information of a transmission may indicate a DMRS reduction pattern to indicate that one or more DMRS of a transmission are omitted.

FIG. 9B illustrates an example 950 including a first DMRS reduction pattern associated with the first transmission 910 and the second transmission 920, as presented herein. For example, the first DMRS reduction pattern may indicate that the first UE may omit or skip transmitting the third DMRS 922 and/or the fourth DMRS 924 of the second transmission 920. As shown in FIG. 9B, the first UE may transmit the first transmission 910 including the first DMRS 912, the second DMRS 914, and the first PTRS 916, but the DMRS of the second transmission 920 is omitted. In some examples, the omitted or skipped DMRS (e.g., the third DMRS 922 and the fourth DMRS 924) may be replaced with data (e.g., PSSCH).

FIG. 9C illustrates an example 960 including a second DMRS reduction pattern associated with the first transmission 910 and the second transmission 920, as presented herein. For example, the second DMRS reduction pattern may indicate that the first UE may omit or skip transmitting the second DMRS 914 of the first transmission 910 and the third DMRS 922 of the second transmission 920. As shown in FIG. 9C, the first UE may transmit the first transmission 910 including the first DMRS 912 and the second transmission 920 including the fourth DMRS 924. The second UE may use the first DMRS 912 and the fourth DMRS 924 to detect variations in the channel between the first DMRS 912 and the fourth DMRS 924. The omitted or skipped DMRS (e.g., the second DMRS 914 and the third DMRS 922) may be replaced with data (e.g., PSSCH).

As shown in FIGS. 9A, 9B, and 9C, the first transmission 910 includes the first PTRS 916 and the second transmission 920 includes the second PTRS 926. In some examples, configuration information associated with the first PTRS 916 and/or the second PTRS 926 may be pre-configured, such as via RRC signaling while performing a connection establishment procedure or a connection re-establishment procedure. In some examples, the configuration information associated with the first PTRS 916 and/or the second PTRS 926 may be signaled, such as via assistance information (e.g., the example assistance information 720, 722, 724, 726, 728 of FIG. 7).

In some examples, the configuration information may include time and/or frequency density of the first PTRS 916 and/or the second PTRS 926, may include a pattern of the first PTRS 916 and/or the second PTRS 926, may include a sequence for sequence generation of the first PTRS 916 and/or the second PTRS 926, and/or may include antenna ports associated with the first PTRS 916 and/or the second PTRS 926. In some examples, aspects of the configuration information may be pre-configured while other aspects may be indicated at a different time. For example, the time and/or frequency density of the first PTRS 916 and/or the second PTRS 926 may be pre-configured, while the pattern, the sequence, and the antenna ports may be indicated via the assistance information associated with a transmission. As an example, and referring to the example of FIG. 7, the first assistance information 720 may indicate a time and/or frequency density associated with PTRS of subsequent transmissions and the second assistance information 722 may indicate the presence of PTRS in the second transmission 712. The second assistance information 722 may also indicate the pattern, the sequence, and the antenna ports of the PTRS associated with the second transmission 712.

In some examples, the transmitting UE may switch from an event-based PTRS inclusion mode (as shown in FIGS. 8A, 8B, and 8C) to a PTRS inclusion in each transmission mode (as shown in FIGS. 9A, 9B, and 9C), and may switch from the PTRS inclusion in each transmission mode to the event-based PTRS inclusion mode. In some examples, the transmitting UE may signal the switch via upper layer signaling. In some examples, the transmitting may signal the use of the PTRS inclusion in each transmission mode when the link between the transmitting UE and the receiving UE is a low mobility link. For example, with respect to a low mobility link, the channel may change slowly due to low Doppler effect.

In some examples, the transmitting UE may determine whether to use the event-based PTRS inclusion mode or the PTRS inclusion in each transmission mode based on a threshold repetitions quantity. For example, the transmitting UE may increase repetitions of a signal to facilitate coverage extension. In some such examples, it may be beneficial to include PTRS when the quantity of repetitions satisfies the threshold repetitions quantity. For example, when the quantity of repetitions fails to satisfy the threshold repetitions quantity, the transmitting UE may determine to use the event-based PTRS inclusion mode. When the quantity of repetitions satisfies the threshold repetitions quantity, the transmitting UE may determine to use the PTRS inclusion in each transmission mode. In some examples, failing to satisfy the threshold repetitions quantity may include that the quantity of repetitions is less than or equal to the threshold repetitions quantity, and satisfying the threshold repetitions quantity may include that the quantity of repetitions is greater than the threshold repetitions quantity. In some examples, failing to satisfy the threshold repetitions quantity may include that the quantity of repetitions is less than the threshold repetitions quantity, and satisfying the threshold repetitions quantity may include that the quantity of repetitions is greater than or equal to the threshold repetitions quantity.

FIG. 10 illustrates an example communication flow 1000 between a first UE 1002 ("UE-1") and a second UE 1004 ("UE-2"), as presented herein. In the illustrated example, the communication flow 1000 facilitates maintaining phase continuity between transmissions for sidelink DMRS bundling. Aspects of the first UE 1002 and/or the second UE 1004 may be implemented by the UE 104 of FIG. 1 and/or the wireless communication devices 310, 350 of FIG. 3. Although not shown in the illustrated example of FIG. 10, in additional or alternative examples, the first UE 1002 and/or the second UE 1004 may be in communication with one or more other base stations or UEs.

In the illustrated example of FIG. 10, the second UE 1004 transmits a bundling capability 1010 that is received by the first UE 1002. The second UE 1004 may transmit the bundling capability 1010 via RRC signaling, such as while performing a connection establishment procedure or a connection re-establishment procedure, with the first UE 1002. In some examples, the second UE 1004 may transmit the bundling capability 1010 via control information (e.g., SCI) and/or data (e.g., PSSCH).

The bundling capability 1010 may indicate whether the second UE 1004 supports performing sidelink DMRS bundling. In some examples, the bundling capability 1010 may indicate whether the second UE 1004 has the capability to maintain phase continuity. In some examples, the bundling capability 1010 may indicate the structure of its matrix D. For example, the bundling capability 1010 may indicate amplitudes and/or phases associated with different antenna ports.

In the illustrated example of FIG. 10, the first UE 1002 transmits a first transmission 1030 that is received by the second UE 1004. The first transmission 1030 may include a sidelink transmission. The first UE 1002 may also transmit first assistance information 1032 that is received by the second UE 1004. The first assistance information 1032 may be transmitted with the first transmission 1030. For example, the first assistance information 1032 may be included in SCI (e.g., SCI-1 or SCI-2) or a MAC-CE associated with the first transmission 1030.

The first assistance information 1032 may signal a capability to perform sidelink DMRS bundling with one or more transmissions. For example, and with respect to the example of FIG. 7, the first assistance information may indicate that there are five transmissions on which sidelink DMRS bundling may be performed. In some examples, the first assistance information 1032 may indicate a bundling relationship associated with the first transmission 1030. For example, the first assistance information 1032 may indicate a "strong bundling" relationship, a "weak bundling" relationship," or "no bundling" relationship. The first assistance information 1032 may also signal a structure of the transmitting UE matrix $D_t$ with respect to the first transmission 1030. For example, the first assistance information 1032 may indicate that the structure of the transmitting UE matrix $D_t$ is an identity matrix, a diagonal matrix, a bi-diagonal matrix, or a full matrix. In some examples, the first assistance information 1032 may indicate values of the elements of the transmitting UE matrix $D_t$. In some examples, the first assistance information 1032 may indicate a range of values of the elements of the transmitting UE matrix $D_t$. In some examples, the first assistance information 1032 may indicate a bundling class associated with the elements of the transmitting UE matrix $D_t$.

The first UE 1002 may also transmit a second transmission 1040 and second assistance information 1042 that is received by the second UE 1004. Similar to the first assistance information 1032, the second assistance information 1042 may be transmitted with the second transmission 1040. For example, the second assistance information 1042 may be included in SCI (e.g., SCI-1 or SCI-2) or a MAC-CE associated with the second transmission 1040.

In some examples, the second assistance information 1042 may signal a capability to perform sidelink DMRS bundling with the first transmission 1030 and the second transmission 1040. The second assistance information 1042 may also indicate a bundling relationship associated with the second transmission 1040. For example, the second assistance information 1042 may indicate a "strong bundling"

relationship, a "weak bundling" relationship," or "no bundling" relationship. The second assistance information 1042 may signal a structure of the transmitting UE matrix $D_t$ with respect to the second transmission 1040. For example, the second assistance information 1042 may indicate that the structure of the transmitting UE matrix $D_t$ is an identity matrix, a diagonal matrix, a bi-diagonal matrix, or a full matrix. In some examples, the second assistance information 1042 may indicate values of the elements of the transmitting UE matrix $D_t$. In some examples, the second assistance information 1042 may indicate a range of values of the elements of the transmitting UE matrix $D_t$. In some examples, the second assistance information 1042 may indicate a bundling class associated with the elements of the transmitting UE matrix $D_t$. In some examples, the second UE 1004 may use the second assistance information 1042 to update its previous values of the elements of the transmitting UE matrix $D_t$.

Although the illustrated example of FIG. 10 includes transmitting a first transmission 1030 and a second transmission 1040, it may be appreciated that the transmissions 1030, 1040 may not be the respective first transmission and second transmission of a sequence. For example, the first transmission 1030 may refer to the second transmission 712 of FIG. 7 and the second transmission 1040 may refer to the third transmission 714 of FIG. 7.

At 1050, the second UE 1004 may identify a bundling relationship between the first transmission 1030 and the second transmission 1040. For example, the second assistance information 1042 may indicate a strong bundling relationship between the first transmission 1030 and the second transmission 1040, as described in connection with the second transmission 712 and the third transmission 714, and in connection with the third transmission 714 and the fourth transmission 716 of FIG. 7. In some examples, the second assistance information 1042 may indicate a weak bundling relationship between the first transmission 1030 and the second transmission 1040, as described in connection with the first transmission 710 and the second transmission 712 of FIG. 7. In some examples, the second assistance information 1042 may indicate no bundling relationship between the first transmission 1030 and the second transmission 1040, as described in connection with the fourth transmission 716 and the fifth transmission 718 of FIG. 7.

In some examples, the second UE 1004 may identify the bundling relationship between the first transmission 1030 and the second transmission 1040 based on the structure of the transmitting UE matrix $D_t$. For example, the second UE 1004 may determine that the bundling relationship is strong when the structure of the transmitting UE matrix $D_t$ is an identity matrix. The second UE 1004 may determine that the bundling relationship is weak when the structure of the transmitting UE matrix $D_t$ is a diagonal matrix. In some examples, based on the elements of the transmitting UE matrix $D_t$, the second UE 1004 may determine that a bi-diagonal matrix or a full matrix indicates no bundling between the first transmission 1030 and the second transmission 1040.

At 1052, the second UE 1004 may estimate amplitude jumps and/or phase jumps. In some examples, the second UE 1004 may use the bundling relationship to estimate the amplitude jumps and/or the phase jumps. For example, when the bundling relationship is strong, then the second UE 1004 may determine that the diagonal elements of the transmitting UE matrix $D_t$ are equal to one and that the remaining elements are equal to zero. In examples in which the bundling relationship is weak, the second UE 1004 may use the structure of the transmitting UE matrix $D_t$ to determine how many elements of the transmitting UE matrix $D_t$ may be set to zero. In examples in which there is no bundling relationship, the second UE 1004 may determine that all of the elements of the transmitting UE matrix $D_t$ are set to non-zero values.

At 1054, the second UE 1004 may perform channel estimation. For example, the second UE 1004 may use Equation 1 and Equation 2 (reproduced below) to perform the channel estimation.

$$y_1 = H \cdot P x_1 + n_1 \qquad \text{Equation 1:}$$

$$y_2 = D_r \cdot H \cdot D_t \cdot P x_2 + n_2 \qquad \text{Equation 2:}$$

In Equation 1, the first received signal $y_1$ may correspond to the first transmission 1030. Similarly, in Equation 2, the second received signal $y_2$ may correspond to the second transmission 1040. In examples in which the bundling relationship is strong, Equation 2 may be simplified and Equation 5 (reproduced below) may be used to perform the channel estimation.

$$y_2 = H \cdot P x_2 + n_2 \qquad \text{Equation 5:}$$

In examples in which the bundling relationship is strong or weak, the second UE 1004 may use the DMRS from the first transmission 1030 and the second transmission 1040 to estimate the same channel across the first transmission 1030 and the second transmission 1040 (e.g., to estimate the channel matrix H). In examples in which there is no bundling relationship, the second UE 1004 may use the DMRS from the first transmission 1030 to estimate a first channel matrix H associated with the first transmission 1030 and may use the DMRS from the second transmission 1040 to estimate a second channel matrix H associated with the second transmission 1040.

At 1056, the second UE 1004 may decode the transmissions. In some examples, the decoding of the transmissions may be based on the estimated channel conditions. For example, the second UE 1004 may use the same channel matrix H to decode the first transmission 1030 and the second transmission 1040 (e.g., when sidelink DMRS bundling is performed). In other examples, the second UE 1004 may use a first channel matrix H to decode the first transmission 1030 and may use a second channel matrix H to decode the second transmission 1040 (e.g., when there is no bundling relationship between the first transmission 1030 and the second transmission 1040).

In some examples, the first UE 1002 may insert an additional reference signal with a transmission to assist the second UE 1004 with estimating the amplitude and/or phase jumps (e.g., at 1052). For example, at 1020, the first UE 1002 may determine a PTRS transmission mode. In some examples, the first UE 1002 may determine the PTRS transmission mode based on a quantity of repetitions. For example, when the quantity of repetitions satisfies a threshold repetitions quantity, the first UE 1002 may determine to use the PTRS inclusion in each transmission mode. Otherwise, the first UE 1002 may determine to use the event-based PTRS inclusion mode.

In some examples, the first UE 1002 may determine to use the event-based PTRS inclusion mode, as described in connection with the examples of FIGS. 8A, 8B, and 8C. For example, the first UE 1002 may transmit the first transmission 1030 to the second UE 1004 and forego including PTRS with the first transmission 1030. Aspects of transmitting the first transmission 1030 while avoiding transmitting the PTRS are described in connection with the examples of FIGS. 8A, 8B, and 8C.

At 1034, the first UE 1002 may detect the occurrence of a phase discontinuity event. For example, the first UE 1002 may determine that a time gap between the first transmission 1030 and the second transmission 1040 fails to satisfy a threshold duration. In some examples, the occurrence of the phase discontinuity event may include the first UE 1002 switching to a receive mode after transmitting the first transmission 1030 and before transmitting the second transmission 1040. In some examples, the occurrence of the phase discontinuity event may include the first UE 1002 transmitting another transmission (e.g., an uplink transmission or another initial sidelink transmission) after transmitting the first transmission 1030 and before transmitting the second transmission 1040. In such examples, the first UE 1002 may adjust its RF circuitry to facilitate switching to the receive mode or to transmit the other transmission. Such an adjustment to the RF circuitry may introduce amplitude jumps and/or phase jumps at the first UE 1002.

In some examples, the occurrence of the phase discontinuity event may be based on reception of an indication from the second UE 1004. For example, the second UE 1004 may transmit an event indication 1036 that is received by the first UE 1002. The second UE 1004 may transmit the event indication 1036 when the second UE 1004 determines that it is unable to maintain phase continuity between the first transmission 1030 and the second transmission 1040. For example, the second UE 1004 may switch to a transmit mode after receiving the first transmission 1030 and before receiving the second transmission 1040. In other examples, the second UE 1004 may receive another transmission after receiving the first transmission 1030 and before receiving the second transmission 1040. In such examples, the second UE 1004 may adjust its RF circuitry to facilitate switching to the transmit mode or to receive the other transmission. Such as adjustment to the RF circuitry may introduce amplitude jumps and/or phase jumps at the second UE 1004.

In some examples, after detecting the occurrence of the event (e.g., at 1034), the first UE 1002 may insert PTRS 1041 with the second transmission 1040 to the second UE 1004. Aspects of the second transmission 1040 with the PTRS 1041 are described in connection with the second transmission 820 of FIGS. 8A, 8B, and 8C.

Referring again to 1020, in some examples, the first UE 1002 may determine to use the PTRS inclusion in each transmission mode, as described in connection with the examples of FIGS. 9A, 9B, and 9C. For example, the first UE 1002 may transmit the first transmission 1030 to the second UE 1004 and include PTRS 1031 with the first transmission 1030. Aspects of transmitting the first transmission 1030 with the PTRS 1031 are described in connection with the examples of the first transmission 910 of FIGS. 9A, 9B, and 9C.

The first UE 1002 may also transmit the second transmission 1040 with the PTRS 1041. Aspects of transmitting the second transmission 1040 with the PTRS 1041 are described in connection with the examples of the second transmission 920 of FIGS. 9A, 9B, and 9C.

At 1052, the second UE 1004 may use the PTRS 1031 of the first transmission 1030 and/or the PTRS 1041 of the second transmission 1040 to estimate the amplitude jump and/or phase jump.

In some examples, the first UE 1002 may provide the PTRS transmission mode and/or configuration information associated with the PTRS via a configuration. For example, the first UE 1002 may transmit a bundling configuration 1024 that is received by the second UE 1004. The first UE 1002 may transmit the bundling configuration 1024 while performing a connection establishment procedure with the second UE 1004 or while performing a connection re-establishment procedure with the second UE 1004. For example, the first UE 1002 may transmit the bundling configuration 1024 via RRC signaling.

The bundling configuration 1024 may indicate the PTRS transmission mode (e.g., the event-based PTRS inclusion mode or the PTRS inclusion in each transmission mode). In some examples, the bundling configuration 1024 may indicate the time and/or frequency density associated with the PTRS of a transmission (e.g., the PTRS 1031 of the first transmission 1030 and/or the PTRS 1041 of the second transmission 1040). In some examples, the bundling configuration 1024 may indicate a pattern, may indicate a sequence for sequence generation, and/or may indicate antenna ports associated with the PTRS of a transmission (e.g., the PTRS 1031 of the first transmission 1030 and/or the PTRS 1041 of the second transmission 1040).

In some examples, the bundling configuration 1024 may indicate the threshold duration associated with the time gap. In some examples, the bundling configuration 1024 may indicate the ranges associated with the bundling classes (e.g., as shown in FIG. 7). In some examples, the bundling configuration 1024 may indicate the threshold repetitions quantity.

In some examples, the first UE 1002 may transmit the PTRS transmission mode and/or configuration information associated with the PTRS via the bundling configuration 1024 and may then update one or more aspects via assistance information. For example, the bundling configuration 1024 may indicate that the first UE 1002 is using the event-based PTRS inclusion mode, and then the first assistance information 1032 associated with the first transmission 1030 may indicate that the first UE 1002 is switching to the PTRS inclusion in each transmission mode. In other examples, the assistance information may indicate a switch from the PTRS inclusion in each transmission mode to the event-based PTRS inclusion mode.

In some examples, the first UE 1002 may determine to reduce DMRS in a transmission by, for example, skipping or omitting one or more DMRS. For example, at 1022, the first UE 1002 may determine a DMRS reduction pattern to reduce the quantity of DMRS transmitted across the first transmission 1030 and the second transmission 1040. In a first example DMRS reduction pattern, the first UE 1002 may determine to omit one or more DMRS of the second transmission 1040. For example, the first UE 1002 may transmit the DMRS of the first transmission 1030 and omit transmitting the DMRS of the second transmission 1040. Aspects of the first example DMRS reduction pattern are described in connection with the example 850 of FIG. 8B and the example 950 of FIG. 9B.

In a second example DMRS reduction pattern, the first UE 1002 may determine to omit DMRS from the first transmission 1030 and the second transmission 1040. For example, the first UE 1002 may transmit the first DMRS of the first transmission 1030 and skip one or more remaining DMRS of the first transmission 1030. The first UE 1002 may also transmit the last DMRS of the second transmission 1040 and skip one or more preceding DMRS of the second transmission 1040. Aspects of the second example DMRS reduction pattern are described in connection with the example 860 of FIG. 8C and the example 960 of FIG. 9C.

In some examples, the first UE 1002 may transmit an indication of the DMRS reduction pattern via the bundling configuration 1024. In some examples, the first UE 1002 may transmit an indication of the DMRS reduction pattern via assistance information associated with a transmission.

Figure 11:
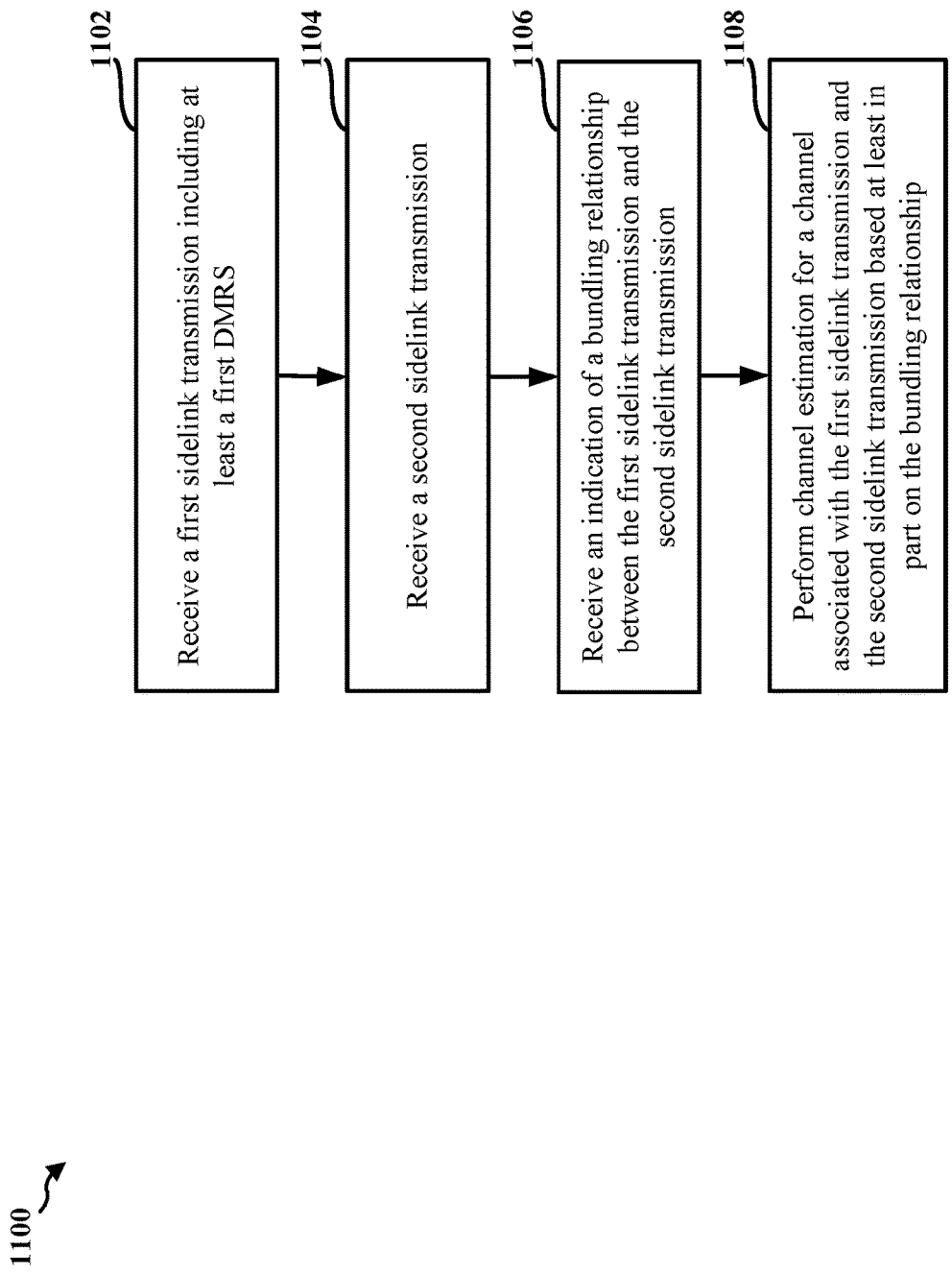
FIG. 11 is a flowchart of a method of wireless communication at a receiving UE, in accordance with the teachings disclosed herein.

FIG. 11 is a flowchart 1100 of a method of wireless communication. The method may be performed by a receiving UE (e.g., the UE 104, the second wireless communication device 350, the second UE 704, the second UE 1004, and/or an apparatus 1302 of FIG. 13). The method may facilitate improving communication performance, for example, by improving channel estimation and increasing throughput by enabling the receiving UE to perform sidelink DMRS bundling.

At 1102, the receiving UE receives a first sidelink transmission including at least a first DMRS, as described in connection with the first transmission 1030 of FIG. 10. For example, 1102 may be performed by a sidelink component 1340 of the apparatus 1302 of FIG. 13.

At 1104, the receiving UE receives a second sidelink transmission, as described in connection with second transmission 1040 of FIG. 10. For example, 1104 may be performed by the sidelink component 1340 of the apparatus 1302 of FIG. 13. In some examples, the first sidelink transmission and the second sidelink transmission together may include at least the first DMRS and a second DMRS.

At 1106, the receiving UE receives an indication of a bundling relationship between the first sidelink transmission and the second sidelink transmission, as described in connection with the assistance information 1032, 1042 of FIG. 10. The receiving UE may receive the indication of the bundling relationship via RRC signaling, via SCI (e.g., SCI-1 and/or SCI-2), or via a MAC-CE. For example, 1106 may be performed by a relationship component 1342 of the apparatus 1302 of FIG. 13. The bundling relationship may include at least one of strong bundling, weak bundling, or no bundling, as described in connection with the examples of FIG. 7.

In some examples, the receiving UE may receive the bundling relationship with the second sidelink transmission. In some examples, the bundling relationship may include a structure of a transmitting UE matrix $D_t$. For example, the bundling relationship may indicate that the structure of the transmitting UE matrix $D_t$ is an identity matrix, a diagonal matrix, a bi-diagonal matrix, or a full matrix. In some examples, the bundling relationship may further include one or more of: an amplitude jump value, a phase jump value, an amplitude jump range, a phase jump range, and a bundling class associated with at least one of the amplitude jump range and the phase jump range.

At 1108, the receiving UE performs channel estimation for a channel associated with the first sidelink transmission and the second sidelink transmission based at least in part on the bundling relationship, as described in connection with 1054 of FIG. 10. For example, 1108 may be performed by an estimation component 1344 of the apparatus 1302 of FIG. 13.

In examples in which the bundling relationship indicates a strong bundling, the receiving UE may combine the DMRS from the first transmission and the second transmission to perform the channel estimation. For example, the receiving UE may use Equation 1 (above) and Equation 5 (above) to perform the channel estimation.

In examples in which the bundling relationship indicates a weak bundling, the receiving UE may use Equation 1 (above) and Equation 2 (above) to determine the elements of the transmitting UE matrix $D_t$ and then combine the DMRS from the respective transmissions to perform the channel estimation.

In examples in which the bundling relationship indicates no bundling, the receiving UE may use DMRS of the first transmission to perform channel estimation for the first transmission and may use DMRS of the second transmission to perform channel estimation for the second transmission.

Figure 12:
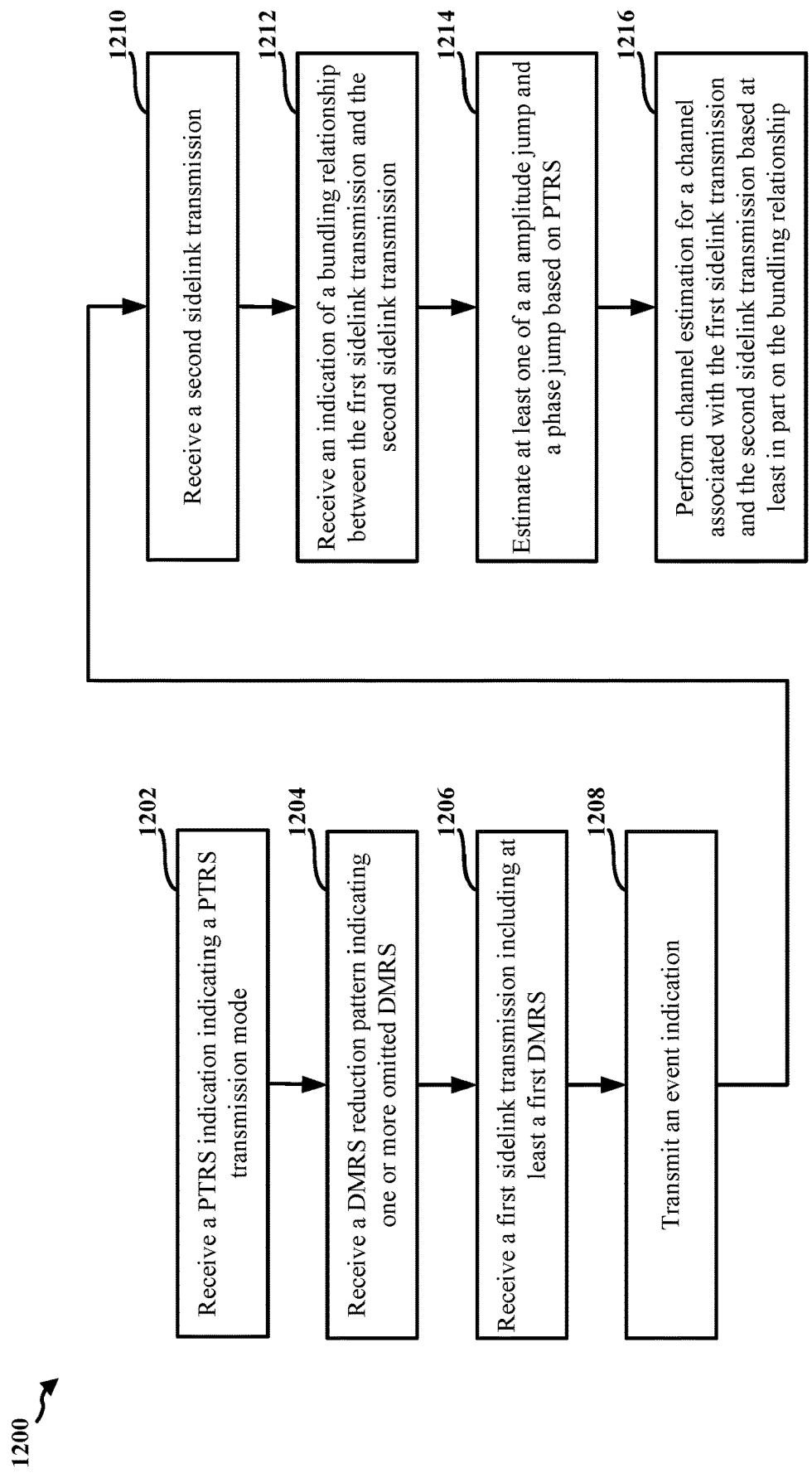
FIG. 12 is a flowchart of a method of wireless communication at a receiving UE, in accordance with the teachings disclosed herein.

FIG. 12 is a flowchart 1200 of a method of wireless communication. The method may be performed by a receiving UE (e.g., the UE 104, the second wireless communication device 350, the second UE 704, the second UE 1004, and/or an apparatus 1302 of FIG. 13). The method may facilitate improving communication performance, for example, by improving channel estimation and increasing throughput by enabling the receiving UE to perform sidelink DMRS bundling.

At 1206, the receiving UE receives a first sidelink transmission including at least a first DMRS, as described in connection with the first transmission 1030 of FIG. 10. For example, 1206 may be performed by a sidelink component 1340 of the apparatus 1302 of FIG. 13.

At 1210, the receiving UE receives a second sidelink transmission, as described in connection with second transmission 1040 of FIG. 10. For example, 1210 may be performed by the sidelink component 1340 of the apparatus 1302 of FIG. 13. In some examples, the first sidelink transmission and the second sidelink transmission together may include at least the first DMRS and a second DMRS.

At 1212, the receiving UE receives an indication of a bundling relationship between the first sidelink transmission and the second sidelink transmission, as described in connection with the assistance information 1032, 1042 of FIG. 10. The receiving UE may receive the indication of the bundling relationship via RRC signaling, via SCI (e.g., SCI-1 and/or SCI-2), or via a MAC-CE. For example, 1212 may be performed by a relationship component 1342 of the apparatus 1302 of FIG. 13. The bundling relationship may include at least one of strong bundling, weak bundling, or no bundling, as described in connection with the examples of FIG. 7.

In some examples, the receiving UE may receive the bundling relationship with the second sidelink transmission. In some examples, the bundling relationship may include a structure of a transmitting UE matrix $D_t$. For example, the bundling relationship may indicate that the structure of the transmitting UE matrix $D_t$ is an identity matrix, a diagonal matrix, a bi-diagonal matrix, or a full matrix. In some examples, the bundling relationship may further include one or more of: an amplitude jump value, a phase jump value, an amplitude jump range, a phase jump range, and a bundling class associated with at least one of the amplitude jump range and the phase jump range.

At 1216, the receiving UE performs channel estimation for a channel associated with the first sidelink transmission and the second sidelink transmission based at least in part on the bundling relationship, as described in connection with 1054 of FIG. 10. For example, 1216 may be performed by an estimation component 1344 of the apparatus 1302 of FIG. 13.

In examples in which the bundling relationship indicates a strong bundling, the receiving UE may combine the DMRS from the first transmission and the second transmission to perform the channel estimation. For example, the receiving UE may use Equation 1 (above) and Equation 5 (above) to perform the channel estimation.

In examples in which the bundling relationship indicates a weak bundling, the receiving UE may use Equation 1 (above) and Equation 2 (above) to determine the elements of the transmitting UE matrix $D_t$ and then combine the DMRS from the respective transmissions to perform the channel estimation.

In examples in which the bundling relationship indicates no bundling, the receiving UE may use DMRS of the first transmission to perform channel estimation for the first transmission and may use DMRS of the second transmission to perform channel estimation for the second transmission.

In some examples, the receiving UE may receive additional reference signals to facilitate estimating amplitude jumps and/or phase jumps. For example, at 1202, the receiving UE may receive a PTRS indication indicating a PTRS transmission mode, as described in connection with 1020 of FIG. 10. For example, 1202 may be performed by a PTRS component 1346 of the apparatus 1302 of FIG. 13. The PTRS transmission mode include an event-based PTRS inclusion mode and a PTRS inclusion in each transmission mode.

In some examples, the PTRS indication may indicate the event-based PTRS inclusion mode, as described in connection with the examples of FIGS. 8A, 8B, and 8C. In some such examples, the receiving UE may receive the first sidelink transmission (e.g., at 1206) excluding PTRS, as described in connection with the first transmission 810 of FIGS. 8A, 8B, and 8C. The receiving UE may receive the second sidelink transmission (e.g., at 1210) including PTRS, as described in connection with the second transmission 820 of FIGS. 8A, 8B, and 8C.

In some examples, the receiving UE may detect the occurrence of a phase discontinuity event. For example, at 1208, the receiving UE may transmit an event indication indicating an occurrence of the phase discontinuity event, as described in connection with the event indication 1036 of FIG. 10. For example, 1208 may be performed by an event component 1348 of the apparatus 1302 of FIG. 13. The receiving UE may receive the second sidelink transmission including the PTRS (e.g., at 1210) after transmitting the event indication.

In some examples, the occurrence of the phase discontinuity event may include a change to a transmit mode after receiving the first sidelink transmission (e.g., at 1206) and before receiving the second sidelink transmission (e.g., at 1210). In some examples, the occurrence of the phase discontinuity event may include receiving another transmission after receiving the first sidelink transmission (e.g., at 1206) and before receiving the second sidelink transmission (e.g., at 1210). The other transmission may include a downlink transmission (e.g., from a base station) or may include a sidelink transmission that is not a repetition of the first sidelink transmission (e.g., an initial sidelink transmission).

In some examples, the PTRS indication (e.g., at 1202) may indicate the PTRS inclusion in each transmission mode, as described in connection with the examples of FIGS. 9A, 9B, and 9C. In some such examples, the receiving UE may receive the first sidelink transmission (e.g., at 1206) including first PTRS, as described in connection with the first transmission 910 and the first PTRS 916 of FIGS. 9A, 9B, and 9C. The receiving UE may receive the second sidelink transmission (e.g., at 1210) including second PTRS, as described in connection with the second transmission 920 and the second PTRS 926 of FIGS. 9A, 9B, and 9C.

At 1214, the receiving UE may estimate at least one of an amplitude jump and a phase jump based on the received PTRS, as described in connection with 1054 of FIG. 10. For example, 1214 may be performed by the estimation component 1344 of the apparatus 1302 of FIG. 13. For example, the PTRS may be used to estimate phase noise associated with the transmission. The receiving UE may use the PTRS to estimate a change in amplitude (e.g., an amplitude jump) and/or a change in phase (e.g., a phase jump) based on the PTRS. The receiving UE may also use the estimated amplitude jump and/or phase jump to facilitate performing the channel estimate (e.g., at 1216).

In some examples, at 1204, the receiving UE may receive a DMRS reduction pattern indicating one or more omitted DMRS, as described in connection with 1022 of FIG. 10. For example, 1204 may be performed by a DMRS pattern component 1350 of the apparatus 1302 of FIG. 13.

In some examples, the DMRS reduction pattern may indicate that the second sidelink transmission includes the one or more omitted DMRS, as described in connection with the example 850 of FIG. 8B and the example 950 of FIG. 9B. For example, the DMRS reduction pattern may indicate that the first sidelink transmission includes the first DMRS and the second DMRS and that the second sidelink transmission does not include DMRS. In some examples, the omitted DMRS may be replaced with data (e.g., PSSCH). The receiving UE may use the first DMRS and the second DMRS to perform the channel estimation (e.g., at 1216).

In some examples, the DMRS reduction pattern may indicate that the one or more omitted DMRS include the middle DMRS from the first sidelink transmission and/or the second sidelink transmission, as described in connection with the example 860 of FIG. 8C and the example 960 of FIG. 9C. For example, the DMRS reduction pattern may indicate that the first sidelink transmission includes the first DMRS and the second sidelink transmission includes the second DMRS. In some examples, the omitted DMRS may be replaced with data (e.g., PSSCH). The receiving UE may use the first DMRS and the second DMRS to perform the channel estimation (e.g., at 1216).

Figure 13:
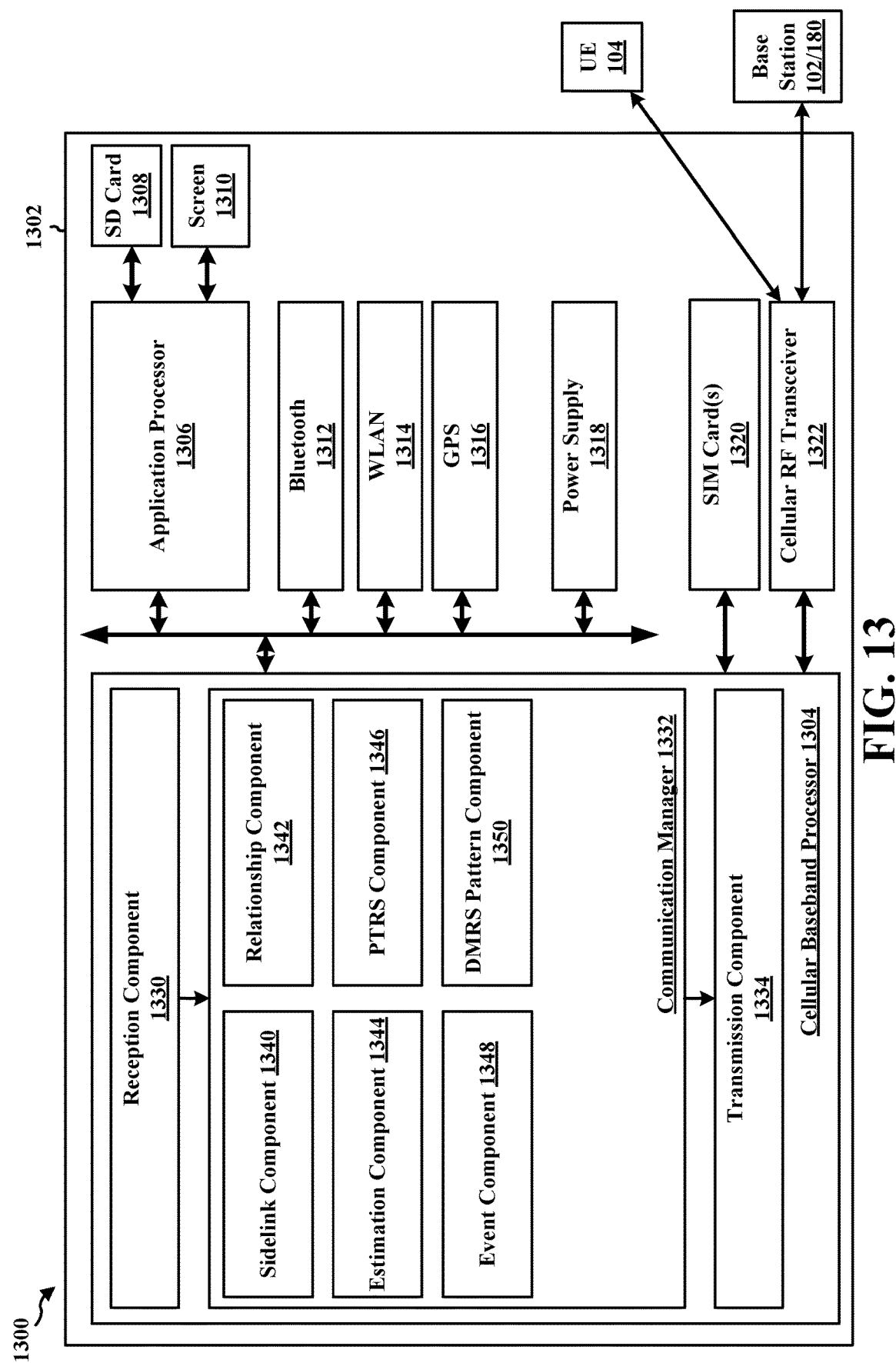
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 may be a UE, or another device configured to transmit and/or receive sidelink communication. The apparatus 1302 includes a baseband processor 1304 (also referred to as a modem) coupled to a RF transceiver 1322. In some aspects, the baseband processor 1304 may be a cellular baseband processor and/or the RF transceiver 1322 may be a cellular RF transceiver. The apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and/or a power supply 1318. The baseband processor 1304 communicates through the RF transceiver 1322 with the UE 104 and/or the base station 102/180. The baseband processor 1304 may include a computer-readable medium/memory. The computer-readable medium/memory may be non-transitory. The baseband processor 1304 is responsible for general processing, including the execution of software stored on the computer-readable medium/memory. The software, when executed by the baseband processor 1304, causes the baseband processor 1304 to perform the various functions described in the present application. The computer-readable medium/memory may also be used for storing data that is manipulated by the baseband processor 1304 when executing software. The baseband processor 1304 further includes a reception component 1330, a communication manager 1332, and a transmission component 1334.

The communication manager 1332 includes the one or more illustrated components. The components within the communication manager 1332 may be stored in the computer-readable medium/memory and/or configured as hardware within the baseband processor 1304. The baseband processor 1304 may be a component of the second wireless communication device 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see the second wireless communication device 350 of FIG. 3) and include the additional modules of the apparatus 1302.

The communication manager 1332 includes a sidelink component 1340 that is configured to receive a first sidelink transmission including at least a first DMRS, for example, as described in connection with 1102 of FIGS. 11 and/or 1206 of FIG. 12.

The example sidelink component 1340 may also be configured to receive a second sidelink transmission, the first sidelink transmission and the second sidelink transmission together including at least the first DMRS and a second DMRS, for example, as described in connection with 1104 of FIGS. 11 and/or 1210 of FIG. 12.

The communication manager 1332 also includes a relationship component 1342 that is configured to receive, from a second UE, an indication of a bundling relationship between the first sidelink transmission and the second sidelink transmission, the bundling relationship including at least one of strong bundling, weak bundling, or no bundling, for example, as described in connection with 1106 of FIGS. 11 and/or 1212 of FIG. 12.

The communication manager 1332 also includes an estimation component 1344 that is configured to perform channel estimation for a channel associated with the first sidelink transmission and the second sidelink transmission based at least in part on the bundling relationship, for example, as described in connection with 1108 of FIGS. 11 and/or 1216 of FIG. 12.

The example estimation component 1344 may also be configured to estimate at least one of an amplitude jump and a phase jump based on received PTRS, for example, as described in connection with 1214 of FIG. 12.

The communication manager 1332 also includes a PTRS component 1346 that is configured to receive a PTRS indication indicating a PTRS transmission mode, the PTRS transmission mode including an event-based PTRS inclusion mode and a PTRS inclusion in each transmission mode, for example, as described in connection with 1202 of FIG. 12.

The communication manager 1332 also includes an event component 1348 that is configured to transmit an event indication indicating an occurrence of a phase discontinuity event, for example, as described in connection with 1208 of FIG. 12.

The communication manager 1332 also includes a DMRS pattern component 1350 that is configured to receive a DMRS reduction pattern indicating one or more omitted DMRS, for example, as described in connection with 1204 of FIG. 12.

The apparatus may include additional components that perform each of the blocks of the algorithm in the flowcharts of FIGS. 11 and/or 12. As such, each block in the flowcharts of FIGS. 11 and/or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for performing any of the aspects of the methods of FIGS. 11 and/or 12. apparatus 1302 may include means for receiving a first sidelink transmission including at least a first DMRS. The apparatus 1302 may include means for receiving a second sidelink transmission, the first sidelink transmission and the second sidelink transmission together including at least the first DMRS and a second DMRS. The apparatus 1302 may include means for receiving, from a second UE, an indication of a bundling relationship between the first sidelink transmission and the second sidelink transmission, the bundling relationship including at least one of strong bundling, weak bundling, or no bundling. The apparatus 1302 may include means for performing channel estimation for a channel associated with the first sidelink transmission and the second sidelink transmission based at least in part on the bundling relationship. The apparatus 1302 may further include means for receiving a PTRS indication indicating a PTRS transmission mode, the PTRS transmission mode including an event-based PTRS inclusion mode and a PTRS inclusion in each transmission mode; and means for estimating at least one of an amplitude jump and a phase jump based on received PTRS. The apparatus 1302 may further include means for transmitting an event indication indicating an occurrence of a phase discontinuity event, where the first UE receives the second sidelink transmission including the PTRS after transmitting the event indication. The apparatus 1302 may further include means for receiving a DMRS reduction pattern indicating one or more omitted DMRS. The means may be one or more of the components of the apparatus 1302 configured to perform the functions recited by the means. As described supra, the apparatus 1302 may include the TX processor 368, the RX processor 356, and the controller/processor 359. As such, in one configuration, the means may be the TX processor 368, the RX processor 356, and the controller/processor 359 configured to perform the functions recited by the means.

Figure 14:
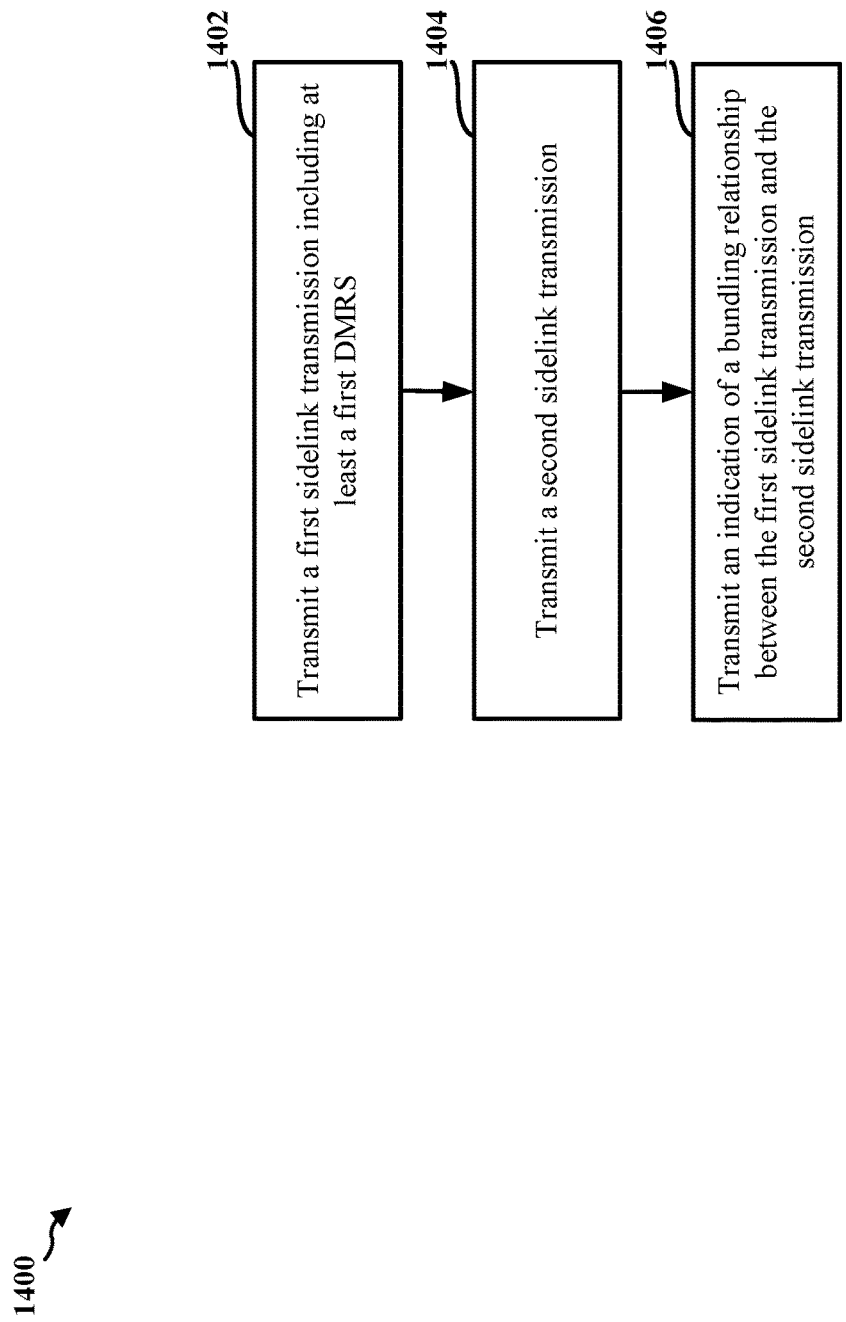
FIG. 14 is a flowchart of a method of wireless communication at a transmitting UE, in accordance with the teachings disclosed herein.

FIG. 14 is a flowchart 1400 of a method of wireless communication. The method may be performed by a transmitting UE (e.g., the UE 104, the first wireless communication device 310, the first UE 702, the first UE 1002, and/or an apparatus 1602 of FIG. 16). The method may facilitate improving communication performance, for example, by improving channel estimation and increasing throughput by enabling the receiving UE to perform sidelink DMRS bundling.

At 1402, the transmitting UE transmits a first sidelink transmission including at least a first DMRS, as described in connection with the first transmission 1030 of FIG. 10. For example, 1402 may be performed by a sidelink component 1640 of the apparatus 1602 of FIG. 16.

At 1404, the transmitting UE transmits a second sidelink transmission, as described in connection with second transmission 1040 of FIG. 10. For example, 1404 may be performed by the sidelink component 1640 of the apparatus 1602 of FIG. 16. In some examples, the first sidelink transmission and the second sidelink transmission together may include at least the first DMRS and a second DMRS.

At 1406, the transmitting UE transmits an indication of a bundling relationship between the first sidelink transmission and the second sidelink transmission, as described in connection with the assistance information 1032, 1042 of FIG. 10. The transmitting UE may transmit the indication of the bundling relationship via RRC signaling, via SCI (e.g., SCI-1 and/or SCI-2), or via a MAC-CE. For example, 1406 may be performed by a relationship component 1642 of the apparatus 1602 of FIG. 16. The bundling relationship may include at least one of strong bundling, weak bundling, or no bundling, as described in connection with the examples of FIG. 7.

In some examples, the transmitting UE may transmit the bundling relationship with the second sidelink transmission. In some examples, the bundling relationship may include a structure of a transmitting UE matrix $D_t$. For example, the bundling relationship may indicate that the structure of the transmitting UE matrix $D_t$ is an identity matrix, a diagonal matrix, a bi-diagonal matrix, or a full matrix. In some examples, the bundling relationship may further include one or more of: an amplitude jump value, a phase jump value, an amplitude jump range, a phase jump range, and a bundling class associated with at least one of the amplitude jump range and the phase jump range.

Figure 15:
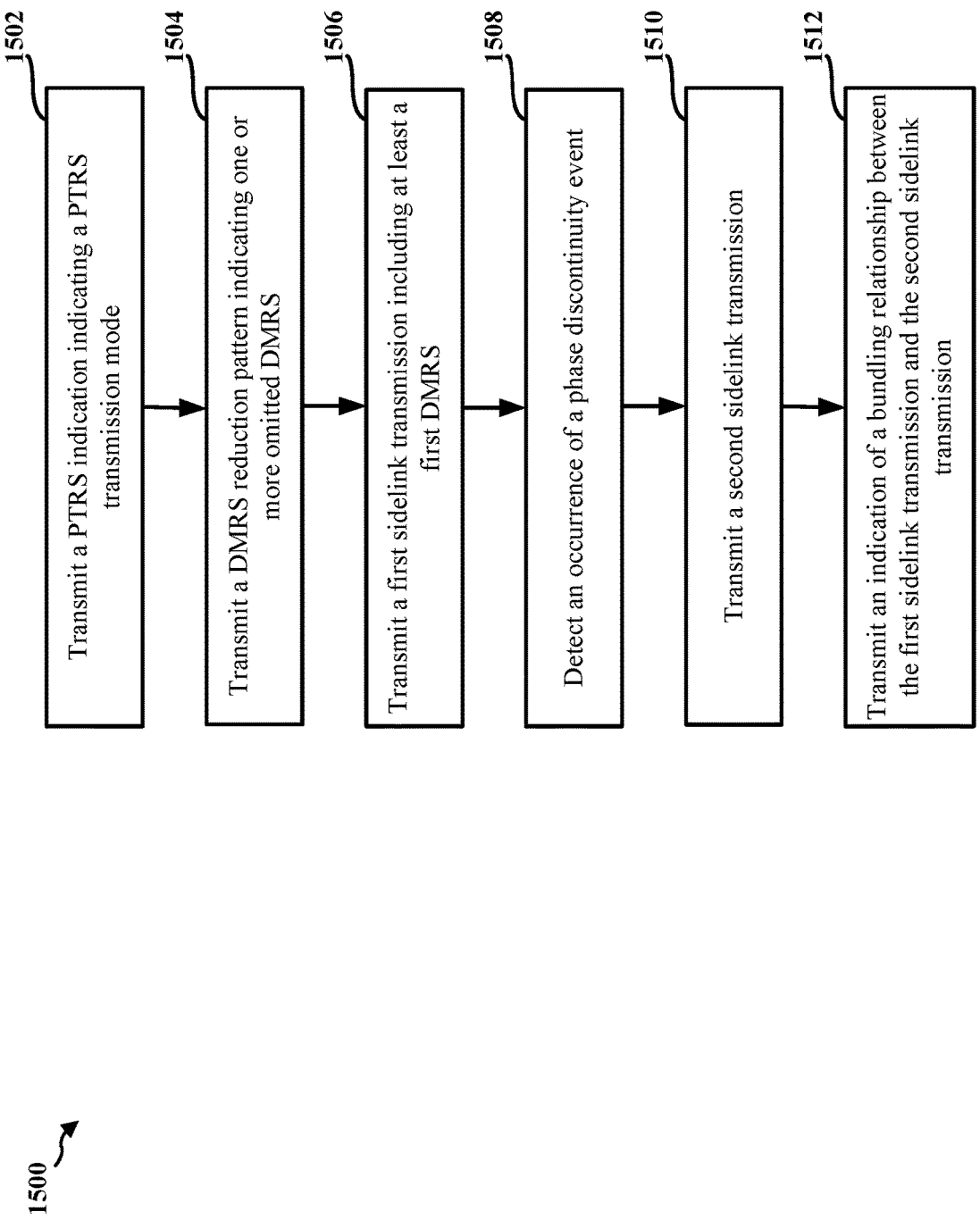
FIG. 15 is a flowchart of a method of wireless communication at a transmitting UE, in accordance with the teachings disclosed herein.

FIG. 15 is a flowchart 1500 of a method of wireless communication. The method may be performed by a transmitting UE (e.g., the UE 104, the first wireless communication device 310, the first UE 702, the first UE 1002, and/or an apparatus 1602 of FIG. 16). The method may facilitate improving communication performance, for example, by improving channel estimation and increasing throughput by enabling the receiving UE to perform sidelink DMRS bundling.

At 1506, the transmitting UE transmits a first sidelink transmission including at least a first DMRS, as described in connection with the first transmission 1030 of FIG. 10. For example, 1506 may be performed by a sidelink component 1640 of the apparatus 1602 of FIG. 16.

At 1510, the transmitting UE transmits a second sidelink transmission, as described in connection with second transmission 1040 of FIG. 10. For example, 1510 may be performed by the sidelink component 1640 of the apparatus 1602 of FIG. 16. In some examples, the first sidelink transmission and the second sidelink transmission together may include at least the first DMRS and a second DMRS.

At 1512, the transmitting UE transmits an indication of a bundling relationship between the first sidelink transmission and the second sidelink transmission, as described in connection with the assistance information 1032, 1042 of FIG. 10. The transmitting UE may transmit the indication of the bundling relationship via RRC signaling, via SCI (e.g., SCI-1 and/or SCI-2), or via a MAC-CE. For example, 1512 may be performed by a relationship component 1642 of the apparatus 1602 of FIG. 16. The bundling relationship may include at least one of strong bundling, weak bundling, or no bundling, as described in connection with the examples of FIG. 7.

In some examples, the transmitting UE may transmit the bundling relationship with the second sidelink transmission. In some examples, the bundling relationship may include a structure of a transmitting UE matrix $D_t$. For example, the bundling relationship may indicate that the structure of the transmitting UE matrix $D_t$ is an identity matrix, a diagonal matrix, a bi-diagonal matrix, or a full matrix. In some examples, the bundling relationship may further include one or more of: an amplitude jump value, a phase jump value, an amplitude jump range, a phase jump range, and a bundling class associated with at least one of the amplitude jump range and the phase jump range.

In some examples, the transmitting UE may transmit additional reference signals to facilitate estimating amplitude jumps and/or phase jumps. For example, at 1502, the transmitting UE may transmit a PTRS indication indicating a PTRS transmission mode, as described in connection with 1020 of FIG. 10. For example, 1502 may be performed by a PTRS component 1644 of the apparatus 1602 of FIG. 16. The PTRS transmission mode include an event-based PTRS inclusion mode and a PTRS inclusion in each transmission mode.

In some examples, the PTRS indication may indicate the event-based PTRS inclusion mode, as described in connection with the examples of FIGS. 8A, 8B, and 8C. In some such examples, the transmitting UE may transmit the first sidelink transmission (e.g., at 1506) excluding PTRS, as described in connection with the first transmission 810 of FIGS. 8A, 8B, and 8C. The transmitting UE may transmit the second sidelink transmission (e.g., at 1510) including PTRS, as described in connection with the second transmission 820 of FIGS. 8A, 8B, and 8C.

In some examples, the transmitting UE may detect the occurrence of a phase discontinuity event. For example, at 1508, the transmitting UE may detect the occurrence of the phase discontinuity event, as described in connection with 1034 of FIG. 10. For example, 1508 may be performed by an event component 1646 of the apparatus 1602 of FIG. 16. The transmitting UE may transmit the second sidelink transmission including the PTRS (e.g., at 1510) after detecting the occurrence of the phase discontinuity event.

In some examples, the occurrence of the phase discontinuity event may include a time gap between the transmitting of the first sidelink transmission (e.g., at 1506) and the transmitting of the second sidelink transmission (e.g., at 1510) that exceeds a threshold duration.

In some examples, the occurrence of the phase discontinuity event may include a change to a receive mode after transmitting the first sidelink transmission (e.g., at 1506) and before transmitting the second sidelink transmission (e.g., at 1510).

In some examples, the occurrence of the phase discontinuity event may include transmitting another transmission after transmitting the first sidelink transmission (e.g., at 1506) and before transmitting the second sidelink transmission (e.g., at 1510). The other transmission may include an uplink transmission (e.g., to a base station) or may include a sidelink transmission that is not a repetition of the first sidelink transmission (e.g., an initial sidelink transmission).

In some examples, the occurrence of the phase discontinuity event may include receiving an event indication from the receiving UE, as described in connection with the event indication 1036 of FIG. 10. In some examples, the event indication may indicate that the receiving UE is unable to maintain phase continuity between the first sidelink transmission and the second sidelink transmission.

In some examples, the PTRS indication (e.g., at 1502) may indicate the PTRS inclusion in each transmission mode, as described in connection with the examples of FIGS. 9A, 9B, and 9C. In some such examples, the transmitting UE may transmit the first sidelink transmission (e.g., at 1506) including first PTRS, as described in connection with the first transmission 910 and the first PTRS 916 of FIGS. 9A, 9B, and 9C. The transmitting UE may transmit the second sidelink transmission (e.g., at 1510) including second PTRS, as described in connection with the second transmission 920 and the second PTRS 926 of FIGS. 9A, 9B, and 9C.

In some example, at 1504, the transmitting UE may transmit a DMRS reduction pattern indicating one or more omitted DMRS, as described in connection with 1022 of FIG. 10. For example, 1504 may be performed by a DMRS pattern component 1648 of the apparatus 1602 of FIG. 16.

In some examples, the DMRS reduction pattern may indicate that the second sidelink transmission includes the one or more omitted DMRS, as described in connection with the example 850 of FIG. 8B and the example 950 of FIG. 9B. For example, the DMRS reduction pattern may indicate that the first sidelink transmission includes the first DMRS and the second DMRS and that the second sidelink transmission does not include DMRS. In some examples, the omitted DMRS may be replaced with data (e.g., PSSCH).

In some examples, the DMRS reduction pattern may indicate that the one or more omitted DMRS include the middle DMRS from the first sidelink transmission and/or the second sidelink transmission, as described in connection with the example 860 of FIG. 8C and the example 960 of FIG. 9C. For example, the DMRS reduction pattern may indicate that the first sidelink transmission includes the first DMRS and the second sidelink transmission includes the second DMRS. In some examples, the omitted DMRS may be replaced with data (e.g., PSSCH).

Figure 16:
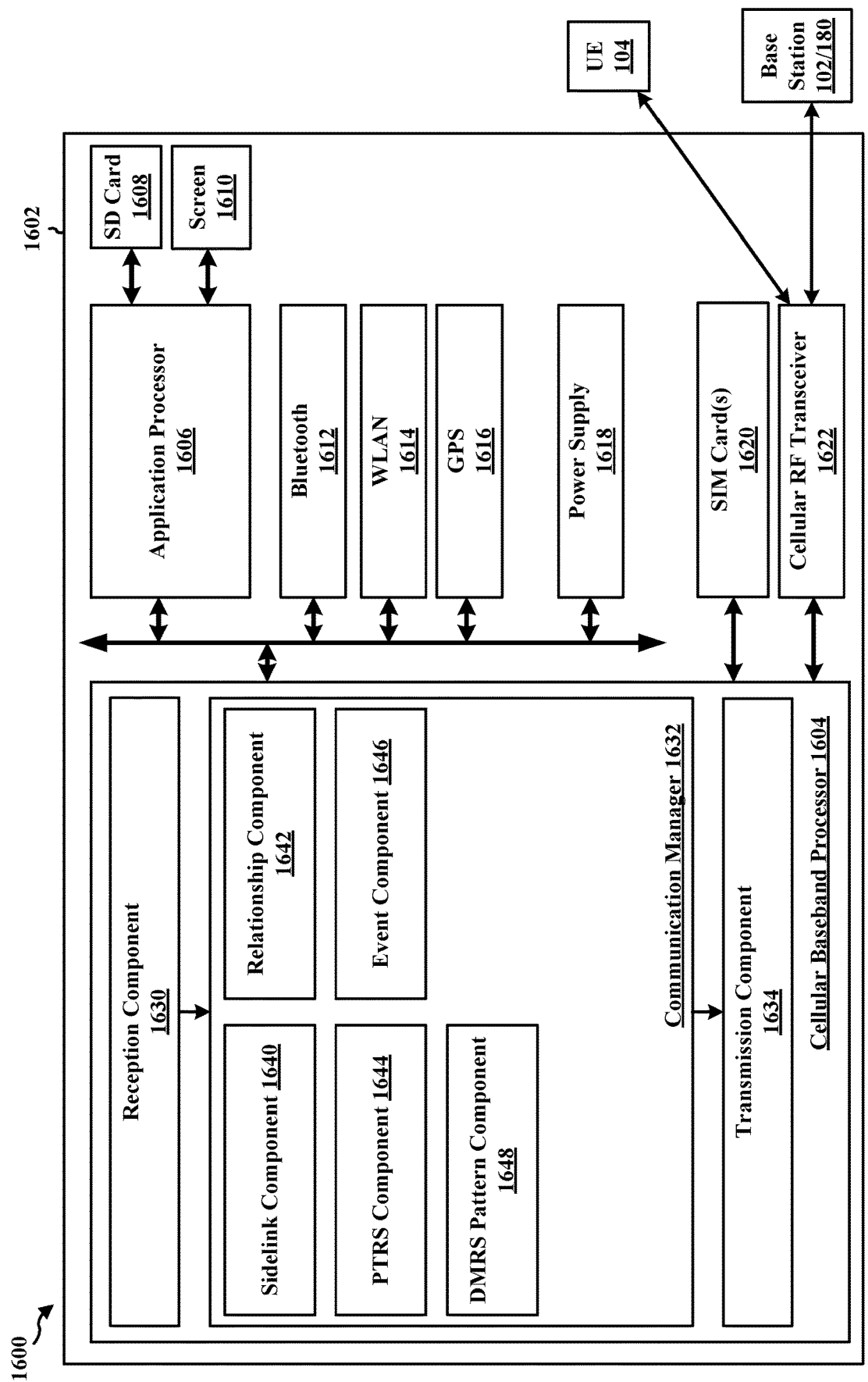
FIG. 16 is a diagram illustrating an example of a hardware implementation for an example apparatus, in accordance with the teachings disclosed herein.

FIG. 16 is a diagram 1600 illustrating an example of a hardware implementation for an apparatus 1602. The apparatus 1602 may be a UE, or another device configured to transmit and/or receive sidelink communication. The apparatus 1602 includes a baseband processor 1604 (also referred to as a modem) coupled to a RF transceiver 1622. In some aspects, the baseband processor 1604 may be a cellular baseband processor and/or the RF transceiver 1622 may be a cellular RF transceiver. The apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and/or a power supply 1618. The baseband processor 1604 communicates through the RF transceiver 1622 with the UE 104 and/or the base station 102/180. The baseband processor 1604 may include a computer-readable medium/memory. The computer-readable medium/memory may be non-transitory. The baseband processor 1604 is responsible for general processing, including the execution of software stored on the computer-readable medium/memory. The software, when executed by the baseband processor 1604, causes the baseband processor 1604 to perform the various functions described in the present application. The computer-readable medium/memory may also be used for storing data that is manipulated by the baseband processor 1604 when executing software. The baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband processor 1604. The baseband processor 1604 may be a component of the second wireless communication device 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see the second wireless communication device 350 of FIG. 3) and include the additional modules of the apparatus 1602.

The communication manager 1632 includes a sidelink component 1640 that is configured to transmit a first sidelink transmission including at least a first DMRS, for example, as described in connection with 1402 of FIGS. 14 and/or 1506 of FIG. 15.

The example sidelink component 1640 may also be configured to transmit a second sidelink transmission, the first sidelink transmission and the second sidelink transmission together including at least the first DMRS and a second DMRS, for example, as described in connection with 1404 of FIGS. 14 and/or 1510 of FIG. 15.

The communication manager 1632 also includes a relationship component 1642 that is configured to transmit, to a second UE, an indication of a bundling relationship between the first sidelink transmission and the second sidelink transmission, the bundling relationship including at least one of strong bundling, weak bundling, or no bundling, for example, as described in connection with 1406 of FIGS. 14 and/or 1512 of FIG. 15.

The communication manager 1632 also includes a PTRS component 1644 that is configured to transmit a PTRS indication indicating a PTRS transmission mode, the PTRS transmission mode including an event-based PTRS inclusion mode and a PTRS inclusion in each transmission mode, for example, as described in connection with 1502 of FIG. 15.

The communication manager 1632 also includes an event component 1646 that is configured to detect an occurrence of a phase discontinuity event, for example, as described in connection with 1508 of FIG. 15.

The communication manager 1632 also includes a DMRS pattern component 1648 that is configured to transmit a DMRS reduction pattern indicating one or more omitted DMRS, for example, as described in connection with 1504 of FIG. 15.

The apparatus may include additional components that perform each of the blocks of the algorithm in the flowcharts of FIGS. 14 and/or 15. As such, each block in the flowcharts of FIGS. 14 and/or 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for performing any of the aspects of the methods of FIGS. 14 and/or 15. For example, apparatus 1602 may include means for transmitting a first sidelink transmission including at least a first DMRS. The apparatus 1602 may include means for transmitting a second sidelink transmission, the first sidelink transmission and the second sidelink transmission together including at least the first DMRS and a second DMRS. The apparatus 1602 may include means for transmitting, to a second UE, an indication of a bundling relationship between the first sidelink transmission and the second sidelink transmission, the bundling relationship including at least one of strong bundling, weak bundling, or no bundling.

The apparatus 1602 may further include means for transmitting a PTRS indication indicating a PTRS transmission mode, the PTRS transmission mode including an event-based PTRS inclusion mode and a PTRS inclusion in each transmission mode. The apparatus 1602 may further include means for detecting an occurrence of a phase discontinuity event. The apparatus 1602 may further include means for transmitting a DMRS reduction pattern indicating one or more omitted DMRS. The means may be one or more of the components of the apparatus 1602 configured to perform the functions recited by the means. As described supra, the apparatus 1602 may include the TX processor 368, the RX processor 356, and the controller/processor 359. As such, in one configuration, the means may be the TX processor 368, the RX processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first UE, comprising: receiving a first sidelink transmission including at least a first DMRS; receiving a second sidelink transmission, the first sidelink transmission and the second sidelink transmission together including at least the first DMRS and a second DMRS; receiving, from a second UE, an indication of a bundling relationship between the first sidelink transmission and the second sidelink transmission, the bundling relationship including at least one of strong bundling, weak bundling, or no bundling; and performing channel estimation for a channel associated with the first sidelink transmission and the second sidelink transmission based at least in part on the bundling relationship.

In aspect 2, the method of aspect 1 further includes that the bundling relationship includes a structure of a transmitting UE matrix $D_r$.

In aspect 3, the method of aspect 1 or aspect 2 further includes that the bundling relationship further includes one or more of: an amplitude jump value, a phase jump value, an amplitude jump range, a phase jump range, and a bundling class associated with at least one of the amplitude jump range and the phase jump range.

In aspect 4, the method of any of aspects 1-3 further includes receiving a PTRS indication indicating a PTRS transmission mode, the PTRS transmission mode including an event-based PTRS inclusion mode and a PTRS inclusion in each transmission mode; and estimating at least one of an amplitude jump and a phase jump based on received PTRS.

In aspect 5, the method of aspect 4 further includes that the PTRS indication indicates the event-based PTRS inclusion mode, and wherein the first UE: receives the first sidelink transmission excluding PTRS, and receives the second sidelink transmission including PTRS.

In aspect 6, the method of aspect 5 further includes transmitting an event indication indicating an occurrence of a phase discontinuity event, wherein the first UE receives the second sidelink transmission including the PTRS after transmitting the event indication.

In aspect 7, the method of aspect 4 further includes that the PTRS indication indicates the PTRS inclusion in each transmission mode, and wherein the first UE: receives the first sidelink transmission including first PTRS, and receives the second sidelink transmission including second PTRS.

In aspect 8, the method of any of aspects 1-7 further includes receiving a DMRS reduction pattern indicating one or more omitted DMRS.

In aspect 9, the method of aspect 8 further includes that the DMRS reduction pattern indicates that: the first sidelink transmission includes the first DMRS and the second DMRS, and the second sidelink transmission excludes DMRS.

In aspect 10, the method of aspect 8 further includes that the DMRS reduction pattern indicates that: the first sidelink transmission includes the first DMRS, and the second sidelink transmission includes the second DMRS.

Aspect 11 is an apparatus for wireless communication at a first UE, comprising means to perform the method of any of aspects 1-10.

In aspect 12, the apparatus of aspect 11 further includes at least one antenna and a transceiver coupled to the at least one antenna and the means to perform the method of any of aspects 1-10.

Aspect 13 is an apparatus for wireless communication at a first UE, comprising a memory and at least one processor coupled to the memory and configured to perform the method of any of aspects 1-10.

In aspect 14, the apparatus of aspect 13 further includes at least one antenna and a transceiver coupled to the at least one antenna and the at least one processor.

Aspect 15 is a non-transitory computer-readable medium storing computer executable code for wireless communication at a first UE, where the code when executed by a processor causes the processor to implement the method of any of aspects 1-10.

Aspect 16 is a method of wireless communication at a first UE, comprising: transmitting a first sidelink transmission including at least a first DMRS; transmitting a second sidelink transmission, the first sidelink transmission and the second sidelink transmission together including at least the first DMRS and a second DMRS; and transmitting, to a second UE, an indication of a bundling relationship between the first sidelink transmission and the second sidelink transmission, the bundling relationship including at least one of strong bundling, weak bundling, or no bundling.

In aspect 17, the method of aspect 16 further includes that the bundling relationship further includes a structure of a transmitting UE matrix $D_t$.

In aspect 18, the method of aspect 16 or 17 further includes that the bundling relationship further includes one or more of: an amplitude jump value, a phase jump value, an amplitude jump range, a phase jump range, and a bundling class associated with at least one of the amplitude jump range and the phase jump range.

In aspect 19, the method of any of aspects 16-18 further includes transmitting a PTRS indication indicating a PTRS transmission mode, the PTRS transmission mode including an event-based PTRS inclusion mode and a PTRS inclusion in each transmission mode.

In aspect 20, the method of aspect 19 further includes that the PTRS indication indicates the event-based PTRS inclusion mode, and wherein the first UE: transmits the first sidelink transmission excluding PTRS, and transmits the second sidelink transmission including PTRS.

In aspect 21, the method of aspect 20 further includes detecting an occurrence of a phase discontinuity event, wherein the first UE transmits the second sidelink transmission including the PTRS after detecting the occurrence of the phase discontinuity event.

In aspect 22, the method of aspect 19 further includes the PTRS indication indicates the PTRS inclusion in each transmission mode, and wherein the first UE: transmits the first sidelink transmission including first PTRS, and transmits the second sidelink transmission including second PTRS.

In aspect 23, the method of any of aspects 16-23 further includes transmitting a DMRS reduction pattern indicating one or more omitted DMRS.

In aspect 24, the method of aspect 23 further includes that the DMRS reduction pattern indicates that: the first sidelink transmission includes the first DMRS and the second DMRS, and the second sidelink transmission excludes DMRS.

In aspect 25, the method of aspect 23 further includes the DMRS reduction pattern indicates that: the first sidelink transmission includes the first DMRS, and the second sidelink transmission includes the second DMRS.

Aspect 26 is an apparatus for wireless communication at a first UE, comprising means to perform the method of any of aspects 16-25.

In aspect 27, the apparatus of aspect 26 further includes at least one antenna and a transceiver coupled to the at least one antenna and the means to perform the method of any of aspects 16-25.

Aspect 28 is an apparatus for wireless communication at a first UE, comprising a memory and at least one processor coupled to the memory and configured to perform the method of any of aspects 16-25.

In aspect 29, the apparatus of aspect 28 further includes at least one antenna and a transceiver coupled to the at least one antenna and the at least one processor.

Aspect 30 is a non-transitory computer-readable medium storing computer executable code for wireless communication at a first UE, where the code when executed by a processor causes the processor to implement the method of any of aspects 16-25.

What is claimed is:

1. An apparatus for wireless communication at a first user equipment (UE), comprising:
   memory; and
   at least one processor coupled to the memory, the memory and the at least one processor configured to:
      receive a first sidelink transmission including at least a first demodulation reference signal (DMRS);
      receive a second sidelink transmission, the first sidelink transmission and the second sidelink transmission together including at least the first DMRS and a second DMRS;
      receive, from a second UE, an indication of a bundling relationship between the first sidelink transmission and the second sidelink transmission, the bundling relationship including at least one of strong bundling, weak bundling, or no bundling; and
      perform channel estimation for a channel associated with the first sidelink transmission and the second sidelink transmission based at least in part on the bundling relationship.

2. The apparatus of claim 1, wherein the bundling relationship further includes a structure of a transmitting UE matrix $D_t$.

3. The apparatus of claim 1, wherein the bundling relationship further includes one or more of:
   an amplitude jump value,
   a phase jump value,
   an amplitude jump range,
   a phase jump range, and
   a bundling class associated with at least one of the amplitude jump range and the phase jump range.

4. The apparatus of claim 1, wherein the memory and the at least one processor are further configured to:
   receive a phase-tracking reference signals (PTRS) indication indicating a PTRS transmission mode, the PTRS transmission mode including an event-based PTRS inclusion mode and a PTRS inclusion in each transmission mode; and
   estimate at least one of an amplitude jump and a phase jump based on received PTRS.

5. The apparatus of claim 4, wherein the PTRS indication indicates the event-based PTRS inclusion mode, and wherein the memory and the at least one processor are configured to:

receive the first sidelink transmission excluding PTRS, and receive the second sidelink transmission including PTRS.

6. The apparatus of claim 5, wherein the memory and the at least one processor are further configured to:
transmit an event indication indicating an occurrence of a phase discontinuity event, wherein reception of the second sidelink transmission including the PTRS occurs after transmission of the event indication.

7. The apparatus of claim 4, wherein the PTRS indication indicates the PTRS inclusion in each transmission mode, and wherein the memory and the at least one processor are configured to:
receive the first sidelink transmission including first PTRS, and
receive the second sidelink transmission including second PTRS.

8. The apparatus of claim 1, wherein the memory and the at least one processor are further configured to:
receive a DMRS reduction pattern indicating one or more omitted DMRS.

9. The apparatus of claim 8, wherein the DMRS reduction pattern indicates that:
the first sidelink transmission includes the first DMRS and the second DMRS, and
the second sidelink transmission excludes DMRS.

10. The apparatus of claim 8, wherein the DMRS reduction pattern indicates that:
the first sidelink transmission includes the first DMRS, and
the second sidelink transmission includes the second DMRS.

11. The apparatus of claim 1, further comprising:
at least one antenna; and
a transceiver coupled to the at least one antenna and the transceiver.

12. A method of wireless communication at a first user equipment (UE), comprising:
receiving a first sidelink transmission including at least a first demodulation reference signal (DMRS);
receiving a second sidelink transmission, the first sidelink transmission and the second sidelink transmission together including at least the first DMRS and a second DMRS;
receiving, from a second UE, an indication of a bundling relationship between the first sidelink transmission and the second sidelink transmission, the bundling relationship including at least one of strong bundling, weak bundling, or no bundling; and
performing channel estimation for a channel associated with the first sidelink transmission and the second sidelink transmission based at least in part on the bundling relationship.

13. The method of claim 12, further comprising:
receiving a phase-tracking reference signals (PTRS) indication indicating a PTRS transmission mode, the PTRS transmission mode including an event-based PTRS inclusion mode and a PTRS inclusion in each transmission mode; and
estimating at least one of an amplitude jump and a phase jump based on received PTRS.

14. The method of claim 13, wherein the PTRS indication indicates the event-based PTRS inclusion mode, and wherein the first UE:
receives the first sidelink transmission excluding PTRS, and receives the second sidelink transmission including PTRS.

15. The method of claim 13, wherein the PTRS indication indicates the PTRS inclusion in each transmission mode, and wherein the first UE:
receives the first sidelink transmission including first PTRS, and
receives the second sidelink transmission including second PTRS.

16. The method of claim 12, further comprising:
receiving a DMRS reduction pattern indicating one or more omitted DMRS.

17. An apparatus for wireless communication at a first user equipment (UE), comprising:
memory; and
at least one processor coupled to the memory, the memory and the at least one processor configured to:
transmit a first sidelink transmission including at least a first demodulation reference signal (DMRS);
transmit a second sidelink transmission, the first sidelink transmission and the second sidelink transmission together including at least the first DMRS and a second DMRS; and
transmit, to a second UE, an indication of a bundling relationship between the first sidelink transmission and the second sidelink transmission, the bundling relationship including at least one of strong bundling, weak bundling, or no bundling.

18. The apparatus of claim 17, wherein the bundling relationship further includes a structure of a transmitting UE matrix $D_t$.

19. The apparatus of claim 17, wherein the bundling relationship further includes one or more of:
an amplitude jump value,
a phase jump value,
an amplitude jump range,
a phase jump range, and
a bundling class associated with at least one of the amplitude jump range and the phase jump range.

20. The apparatus of claim 17, wherein the memory and the at least one processor are further configured to:
transmit a phase-tracking reference signals (PTRS) indication indicating a PTRS transmission mode, the PTRS transmission mode including an event-based PTRS inclusion mode and a PTRS inclusion in each transmission mode.

21. The apparatus of claim 20, wherein the PTRS indication indicates the event-based PTRS inclusion mode, and wherein the memory and the at least one processor are configured to:
transmit the first sidelink transmission excluding PTRS, and
transmit the second sidelink transmission including PTRS.

22. The apparatus of claim 21, wherein the memory and the at least one processor are further configured to:
detect an occurrence of a phase discontinuity event,
wherein transmission of the second sidelink transmission including the PTRS occurs after detection of the occurrence of the phase discontinuity event.

23. The apparatus of claim 20, wherein the PTRS indication indicates the PTRS inclusion in each transmission mode, and wherein the memory and the at least one processor are configured to:
transmit the first sidelink transmission including first PTRS, and transmit the second sidelink transmission including second PTRS.

24. The apparatus of claim 17, wherein the memory and the at least one processor are further configured to:
transmit a DMRS reduction pattern indicating one or more omitted DMRS.

25. The apparatus of claim 24, wherein the DMRS reduction pattern indicates that:
the first sidelink transmission includes the first DMRS and the second DMRS, and
the second sidelink transmission excludes DMRS.

26. The apparatus of claim 24, wherein the DMRS reduction pattern indicates that:
the first sidelink transmission includes the first DMRS, and
the second sidelink transmission includes the second DMRS.

27. The apparatus of claim 17, further comprising:
at least one antenna; and
a transceiver coupled to the at least one antenna and the transceiver.

28. A method of wireless communication at a first user equipment (UE), comprising:
transmitting a first sidelink transmission including at least a first demodulation reference signal (DMRS);
transmitting a second sidelink transmission, the first sidelink transmission and the second sidelink transmission together including at least the first DMRS and a second DMRS; and
transmitting, to a second UE, an indication of a bundling relationship between the first sidelink transmission and the second sidelink transmission, the bundling relationship including at least one of strong bundling, weak bundling, or no bundling.

29. The method of claim 28, further comprising:
transmitting a phase-tracking reference signals (PTRS) indication indicating a PTRS transmission mode, the PTRS transmission mode including an event-based PTRS inclusion mode and a PTRS inclusion in each transmission mode.

30. The method of claim 28, further comprising:
transmitting a DMRS reduction pattern indicating one or more omitted DMRS.

* * * * *